US007145679B2

(12) United States Patent  (10) Patent No.: US 7,145,679 B2
Hitaka  (45) Date of Patent: Dec. 5, 2006

(54) INFORMATION PROCESSING APPARATUS, PRINT MANAGEMENT APPARATUS, PRINT MANAGEMENT SYSTEM AND METHOD, MEMORY MEDIUM STORING COMPUTER-READABLE PROGRAM THEREIN, AND PRINT CONTROL PROGRAM

(75) Inventor: Yosato Hitaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 630 days.

(21) Appl. No.: 10/045,156

(22) Filed: Jan. 15, 2002

(65) Prior Publication Data

US 2002/0093681 A1    Jul. 18, 2002

(30) Foreign Application Priority Data

Jan. 16, 2001   (JP)   ............................. 2001-007679

(51) Int. Cl.
    *G06F 15/00*     (2006.01)
    *G06K 1/00*      (2006.01)
(52) U.S. Cl. ................... 358/1.15; 358/1.13; 358/1.14; 358/1.16; 358/1.17; 358/1.18
(58) Field of Classification Search ............... 358/1.15, 358/1.13, 1.14, 1.16, 1.18; 709/203, 201, 709/232; 400/62
    See application file for complete search history.

(56) References Cited

U.S. PATENT DOCUMENTS 6,594,031 B1 *  7/2003  Taima ....................... 358/1.15
6,607,314 B1 *  8/2003  McCannon et al. ........... 400/62
6,633,400 B1 * 10/2003  Sasaki et al. .............. 358/1.15
6,714,964 B1 *  3/2004  Stewart et al. .............. 709/203
6,762,852 B1 *  7/2004  Fischer ....................... 358/1.15
6,804,019 B1 * 10/2004  Shiohara ..................... 358/1.15
6,922,256 B1 *  7/2005  Davis ......................... 358/1.15
2002/0067504 A1 * 6/2002 Salgado et al. ............ 358/1.15
2003/0182438 A1 * 9/2003 Tenenbaum ................. 709/232
2004/0148335 A1 * 7/2004 Keeney et al. .............. 709/201

* cited by examiner

*Primary Examiner*—Kimberly Williams
*Assistant Examiner*—Satwant Singh
(74) *Attorney, Agent, or Firm*—Fitzpatrick, Cella, Harper & Scinto

(57) ABSTRACT

In a system which receives a print service via the Internet, a client is enabled to recognize the updating of printers provided for a shop which can receive the print service without installing a new printer driver for each printer, thereby enabling it to be used for printing. In a client 100, the above object is accomplished by providing means for forming print data by using a printer driver 102 which can set print set information corresponding to a plurality of printers on the basis of a printer information description file 103, forming a print order on the basis of the formed print data and the print set information set by the printer driver, promoting activation of a Web browser 108, and requesting an access to a center server 120 which can communicate via the Internet.

5 Claims, 15 Drawing Sheets

FIG. 10

CORRESPONDENCE TABLE OF PRINT ORDER

| USER ID | SHOP ID | ORDER ID | PRINT ORDER PASS | DISPLAY IMAGE PASS |
|---------|---------|----------|------------------|--------------------|
| 1000 | 2000 | 4534 | C:¥1000¥2000¥4534.dat | C:¥1000¥2000¥4534.bmp |
| 1000 | 2000 | 7654 | C:¥1000¥2000¥7654.dat | C:¥1000¥2000¥7654.bmp |
| ⋮ | ⋮ | ⋮ | ⋮ | ⋮ |

FIG. 14

```
┌─────────────────────────────────────────────┐ 1401
│ WEB BROWSER                                 │
├─────────────────────────────────────────────┤
│ URL: [              ]        □              │
├─────────────────────────────────────────────┤
│                                             │
│ USER NAME : TARO TOKYO (ID : 1000)          │
│                                             │
│ USING CONDITIONS : PAPER SIZE               │
│        ☑ A4   ☑ A3   □ POSTCARD    ⎫        │
│                                    ⎬ 1402   │
│        □ B5   □ B4   □ USER DEFINITION ⎭    │
│                                             │
│        MEDIA TYPE                           │
│        ☑ NORMAL  □ PHOTO  □ GLOSSY ⎫        │
│          PAPER     P        PAPER  ⎬ 1403   │
│        □ TRANSFER TO    □ OHP      ⎭        │
│          T-SHIRT                            │
│                                             │
│     ※ PAGE LAYOUT                           │
│        ☑ Nup      □ BINDING PRINT  ⎫ 1404   │
│        □ POSTER PRINT □ DUPLEX PRINT ⎭      │
│                                             │
│     ※ FINISHING                             │
│        □ STAPLE  ☑ SADDLE STITCH ~1405      │
│        REGION                               │
│        DESIGNATION [HOKKAIDO ▽] ~1406       │
│                                             │
│     ※ IN THIS ITEM, PLEASE CHECK ONLY FUNCTION│
│        WHICH IS CERTAINLY USED BY ORDER     │
│                                             │
│   1407⎧(DOWNLOAD) (CANCEL)⎫1408             │
└─────────────────────────────────────────────┘
```

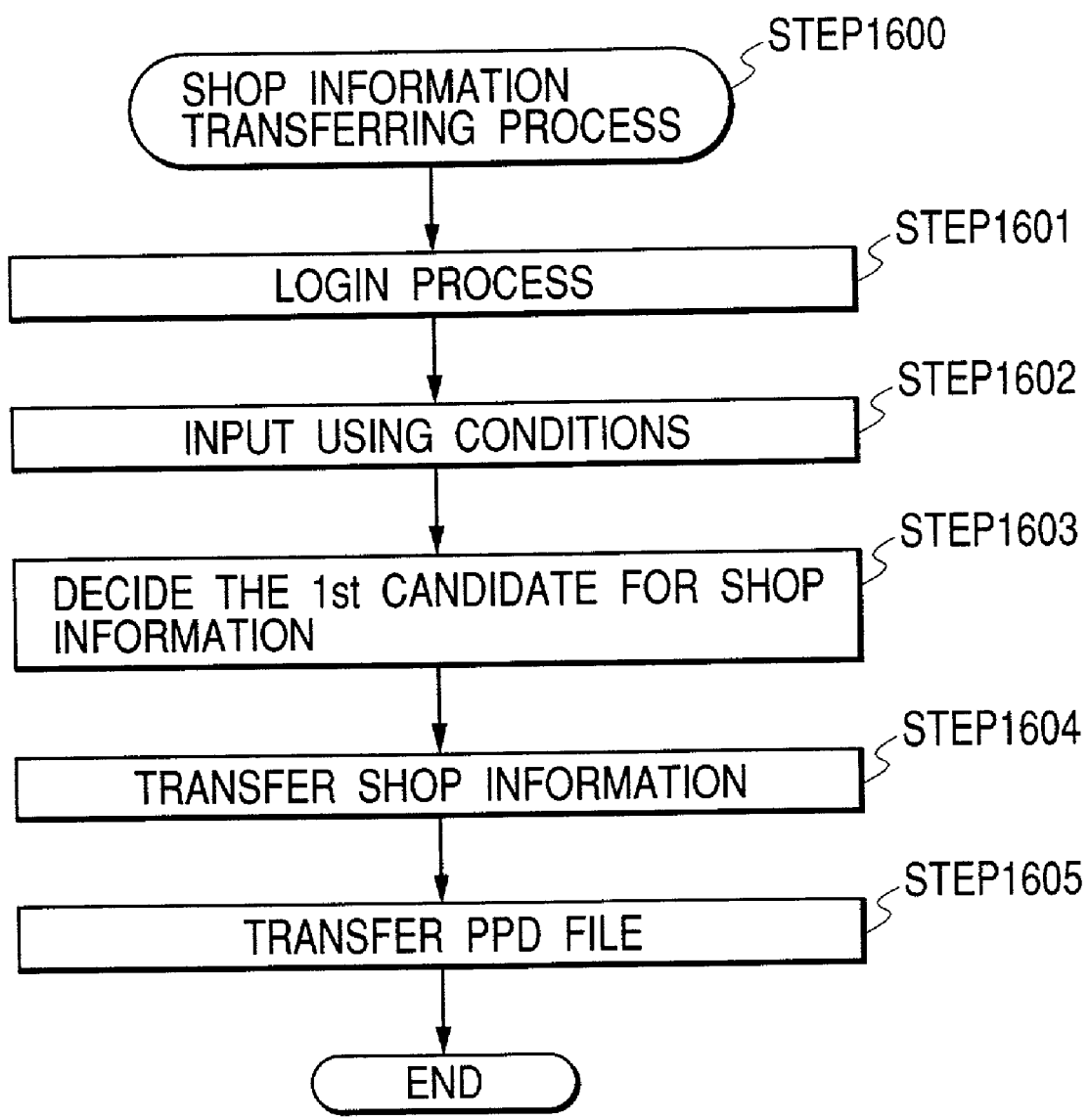

FIG. 17

MEMORY MEDIUM SUCH AS FD/CD ROM, etc

| DIRECTORY INFORMATION |
|---|
| 1st DATA PROCESSING PROGRAM<br>PROGRAM CODE GROUP CORRESPONDING TO STEPS IN FLOWCHART SHOWN IN FIG. 5 |
| 2nd DATA PROCESSING PROGRAM<br>PROGRAM CODE GROUP CORRESPONDING TO STEPS IN FLOWCHART SHOWN IN FIG. 6 |
| 3rd DATA PROCESSING PROGRAM<br>PROGRAM CODE GROUP CORRESPONDING TO STEPS IN FLOWCHART SHOWN IN FIG. 15 |
| 4th DATA PROCESSING PROGRAM<br>PROGRAM CODE GROUP CORRESPONDING TO STEPS IN FLOWCHART SHOWN IN FIG. 9 |
| 5th DATA PROCESSING PROGRAM<br>PROGRAM CODE GROUP CORRESPONDING TO STEPS IN FLOWCHART SHOWN IN FIG. 11 |
| 6th DATA PROCESSING PROGRAM<br>PROGRAM CODE GROUP CORRESPONDING TO STEPS IN FLOWCHART SHOWN IN FIG. 16 |

MEMORY MAP IN MEMORY MEDIUM

INFORMATION PROCESSING APPARATUS, PRINT MANAGEMENT APPARATUS, PRINT MANAGEMENT SYSTEM AND METHOD, MEMORY MEDIUM STORING COMPUTER-READABLE PROGRAM THEREIN, AND PRINT CONTROL PROGRAM

BACKGROUND OF THE INVENTION

1. Field of the Invention

The invention relates to an information processing apparatus which can communicate with an external print management apparatus via the Internet, the print management apparatus, print control system and method, a memory medium in which a computer-readable program has been stored, and the control program. More particularly, the invention relates to a process for issuing a print order from an information processing apparatus to a print management apparatus via the Internet.

2. Related Background Art

FIG. 2. is a system constructional diagram in a print system for realizing a conventional print service of the Internet. A client PC (Personal Computer) 200 is connected to the Internet by using a dial-up system or a normally connecting system. Via a provider or the like, the client PC 200 communicates with a center server 202 which provides the print service. The center server 202 has a print controller 203 and receives a print order (print order information) from a client. Via the Internet, the center server 202 is further connected to one or more shops 204 as print shops for performing an actual print output so that it can communicate therewith. Since the shop 204 is often the same affiliated shop as that of the center server 202, it is connected to the center server by a dedicated line. Therefore, the print controller 203 of the center server 202 actively issues the print order to the shop. At least one printer 205 for executing a printing process of high quality in color is usually provided for the shop 204 as a print shop.

A dedicated application 210 for receiving the print service has been installed in the client PC 200, and print data 201 as a print order is formed by the dedicated application 210. Generally, the print data has been described in a script format in order to receive the print service. For example, a shop name as a print shop which print-outputs the print data, a type name of the printer, a paper size, a designation of a type of recording paper (media type), an image (format with which the print service copes: that is, JPEG, GIF, or a bit map), a range of the image, and edit information for the image (a designation of an image process for the image, a designation of clipping, etc.) has been described. However, according to the conventional print service, the print order requests the center server to print as mentioned above, and a dedicated application is necessary for forming the print order.

In the client PC 200, in order to request the printing of the print data 201 as a print order formed by the dedicated application 210, the dedicated application 210 has a mechanism such that the activation of a browser 211 is promoted via an OS (Operating System) of the client PC 200, a browser for viewing via the Internet is activated and connected to the Internet, and a URL of the center server 202 is designated, thereby communicating with the center server 202. Via the browser 211, the client PC 200 requests the center server 202 to print the print order. All of the lists of the shops to which the print can be ordered are downloaded upon communication and a desired list can be designated at the time of the next print order.

The print controller 203 of the center server 202 selects the shop 204 in which the print data should be printed and outputted on the basis of the print order (print data 201) as a print request received from the browser 210 of the client PC 200, and transmits the print order to the corresponding shop.

As mentioned above, according to the conventional print service that is provided via the Internet, there are problems such that in order to allow the client to form the print target data, it is necessary to previously install the dedicated application for the print service into the client, the print order can be made only from such an application, and it is not easy to increase the number of clients who use the print service because of difficulty of circulation of the dedicated application.

It is, therefore, desirable that the print order of the print target data which is formed by the general application is made by using a printer driver which is generally used in the LAN. There are problems such that for this purpose, the client needs to prepare the printer driver according to the type of printer provided for each shop (print shop), and in order to cover the printers of all of the shops to which the print service can be applied, it is necessary to prepare a large number of printer drivers, so that a possibility of realizing such a construction is low.

SUMMARY OF THE INVENTION

In consideration of the above problems, it is an object of the invention to provide a system which receives an application of a print service via the Internet, wherein the updating of printers provided for a shop to which the print service can be applied can be recognized without installing a new printer driver for each printer, thereby enabling it to be used for printing.

To accomplish the above object, according to the first invention, there is provided an information processing method in an information processing apparatus for requesting a print order from a print management apparatus via the Internet, comprising: a print data forming step of forming print data by using a printer driver which can set print set information corresponding to a plurality of printers on the basis of a printer information description file; a print order forming step of forming the print order on the basis of the formed print data and the print set information set by the printer driver; and an access requesting step of promoting activation of a Web browser and requesting an access to the print management apparatus which can communicate via the Internet.

Further, according to the second invention, there is provided a print management method in a print management apparatus which receives a request for a print order from a client via the Internet, comprising: a printer information transmitting step of transmitting a printer information description file describing print set information corresponding to a plurality of printers to the client via the Internet in accordance with an obtaining request from the client; a data converting step of data-converting print data described by a page description language included in the print order which is transmitted from the client into a printer description language file as a format which does not depend on a printer of a shop; and a print order forming step of forming a shop print order for requesting the shop to print on the basis of print set information which is included in the print order and designates a print setting and the data-converted printer description language file.

The above object is accomplished by the print management apparatus for realizing the above method, a print control program for realizing the above method by the print management apparatus, and a memory medium which stores the print control program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a diagram showing an example of a user interface screen for describing a shop selection page and a print order decision page which are displayed on a Web browser of the client;

FIG. 14 is a diagram showing an example of a user interface screen for explaining a using condition decision page which is displayed to the Web browser of the client;

FIG. 16 is a flowchart for explaining a shop information transferring process in the print management apparatus of the invention; and FIG. 17 is a diagram for explaining a memory map on a memory medium for storing various data processing programs which can be read out by the print system to which the information processing apparatus according to the invention can be applied.

DETAILED DESCRIPTION OF THE PREFERRED EMBODIMENTS

Figure 1:
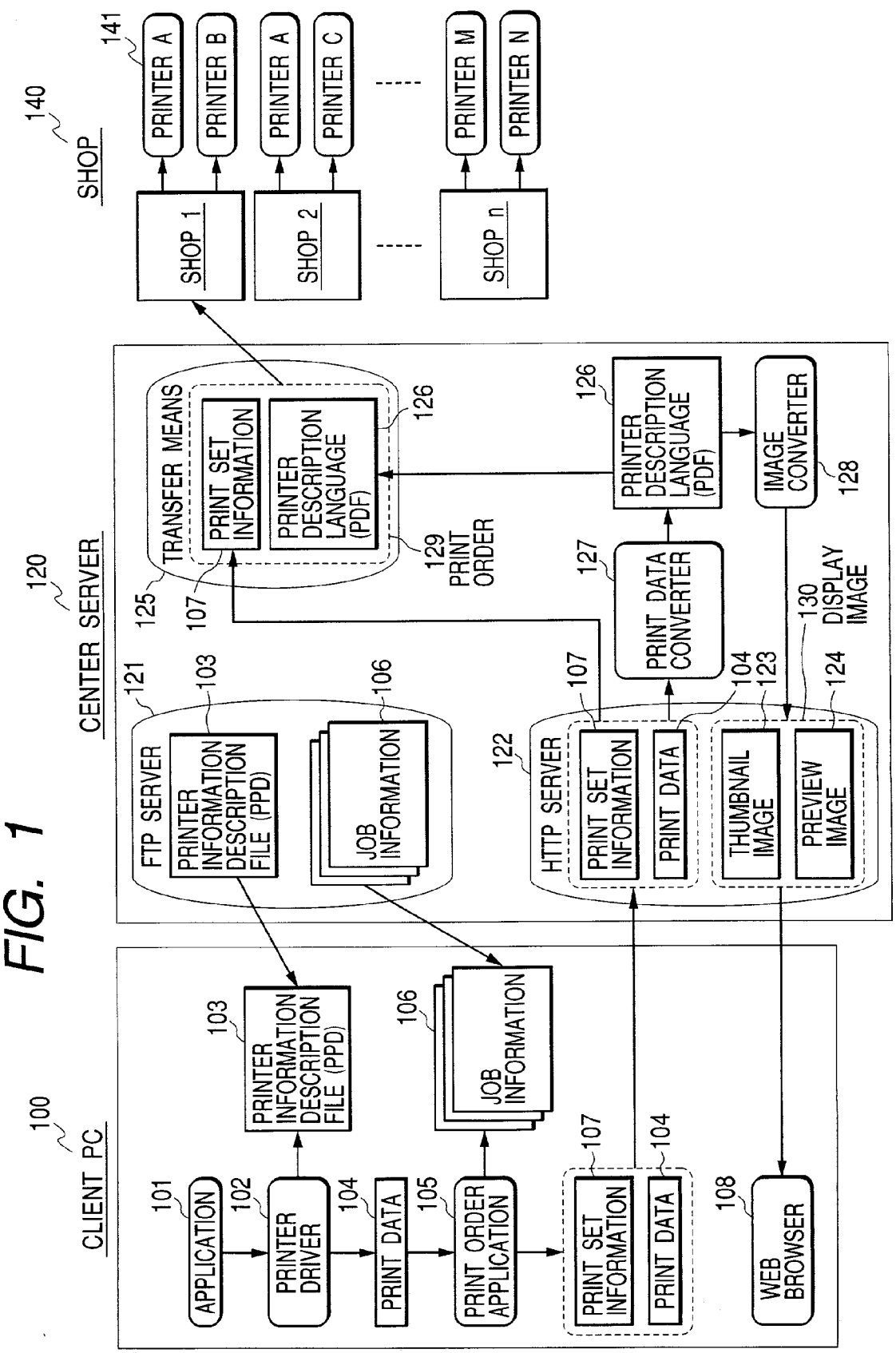
FIG. 1 is a system constructional diagram of a print service via the Internet according to the invention.
Figure 2:
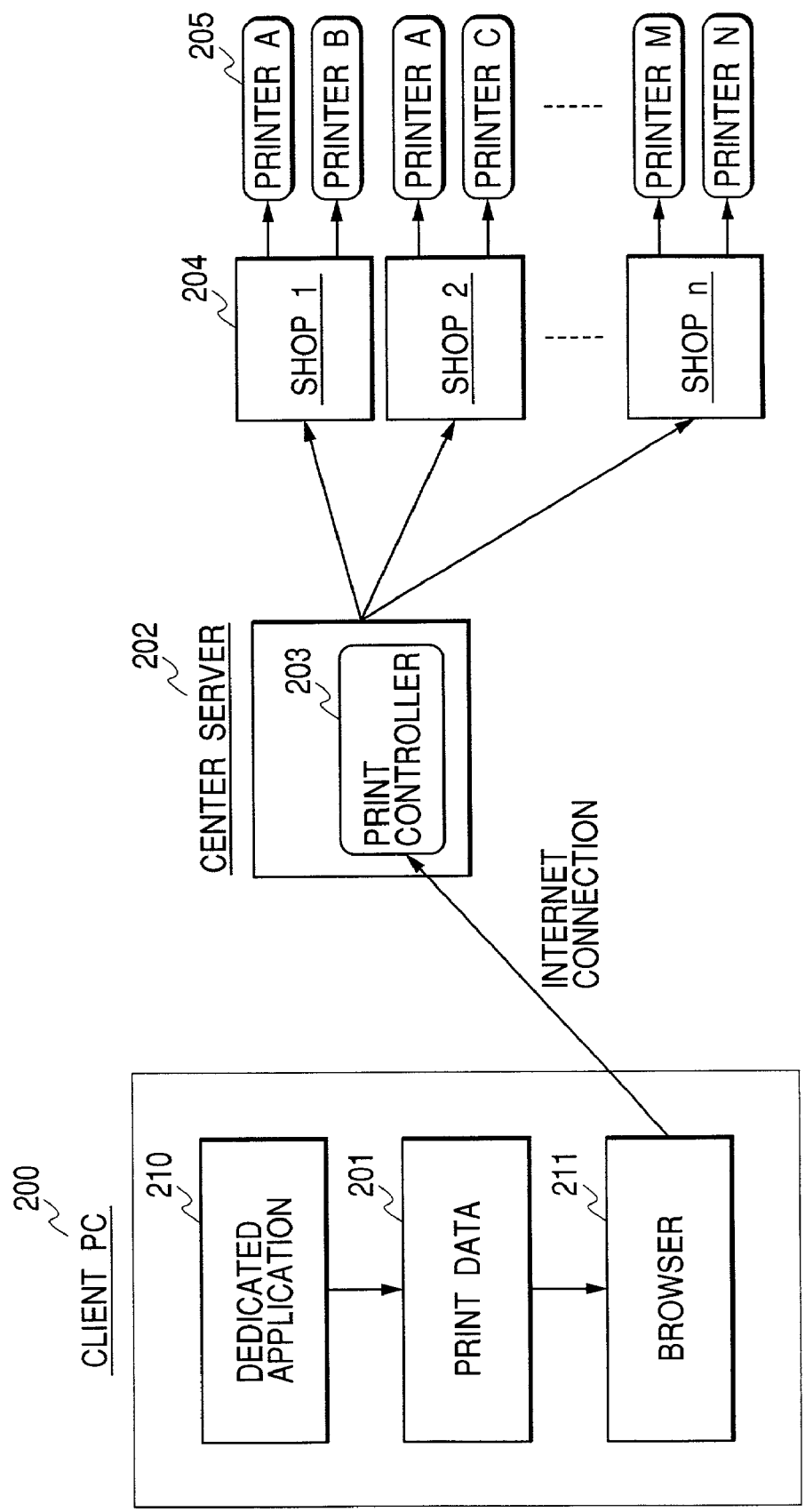
FIG. 2 is a system constructional diagram of a print system via the conventional Internet.

FIG. 1 is a system constructional diagram of a print service according to an embodiment of the invention. In the system, there exist: a client PC (Personal Computer) (hereinafter, also referred to as a client) 100 as an embodiment of an information processing apparatus according to the invention which forms a print order; a center server 120 as an embodiment of a print management apparatus of the invention which receives the print order from each client; and a shop 140 as a print shop having at least one printer 141. The client 100 and center server 120 communicate with each other via the Internet. Since the client 100 corresponds to the information processing apparatus which can be connected to the Internet, a plurality of clients exist. Although the center server 120 and shop 140 communicate with each other via the Internet, the shop 140 can be also directly connected to the center server 120 via a cable or the like so that they can communicate with each other. In the embodiment, since the shop 140 corresponds to a print shop having the information processing apparatus which can be connected to the Internet and the printer 141 which can perform a print output according to a print request, it is assumed that a plurality of shops also exist.

According to the client 100 of the embodiment, the user executes an operation such as formation of a document or the like by using an arbitrary application 101 and forms a print request to a print service of the system. In the client PC 100, when a document serving as a print target is formed by the application 101 and a print instruction in the present print service is issued from the user, a printer driver 102 serving as print data forming means for forming print data of the print service is activated. The printer driver 102 forms a user interface screen for performing a print setting in accordance with attribute information in a printer information description file 103 describing attribute information (device characteristics (print resolution, duplex print, binding print, and finishing such as staple, punch, or the like), a media type which is supported, a paper size) of each printer 141 in the shop 140 which can provide the print service. The printer driver 102 forms print data 104 described by a postscript in accordance with the print setting which is designated by the user.

In the system of the network print service, the printer information description file 103 only for use by the driver is used. The printer information description file 103 is a file in which attributes of the printer have been stored. As a preferred example, for instance, the file 103 can be easily realized by using a PPD PostScript Printer Description) file describing characteristics of a PostScript printer driver. The PostScript printer driver (hereinafter, referred to as a PS driver) converts the print data to print data described by the postscript (hereinafter, such print data is referred to as PS data) on the basis of a draw command generated by the application via the OS (Operating System). The PPD file designates the attribute information for each printer. The PS driver forms PS data on the basis of the PPD file.

A print order application 105 serving as print order forming means is an application for forming a print order for the print data 104 formed by the printer driver 102. The print order application 105 provides a GUI such as designation of a shop which can perform the printing operation, designation of a print option, or the like from a description of the postscript data file (print data) 104 formed by the printer driver 102 and a shop information file 106. The print order application 105 stores information regarding the designation of the set shop, designation of the print option, and the like into print set information 107, forms the print order including the print set information 107 and print data 104, activates a Web browser 108, and uploads the print order into the center server 120 via the Internet.

The shop information file 106 describes shop information (shop name and the like) and information of a print service (media type, A4 simplex print, A4 duplex print, etc.) which can be used in the shop and exists with respect to each shop. The print set information 107 is an information file set on the client PC 100 with respect to data of the print order and describes an ID of a shop on the print destination side, a paper size for printing, a printer name, the number of copies, and the like.

As a Web browser 108 serving as Internet viewing means, a general Web browser installed in the client PC 100 can be used. A thumbnail image 123 and a preview image 124 which are formed by the center server 120 on the basis of the print order managed in the center server 120 are provided to the client 100 by the center server 120 and displayed to a window of the Web browser 108. The Web browser 108 functions as a browser which operates in the client PC 100. The Web browser 108 has functions for interpreting a file described by an HTML (HyperText Markup Language) obtained from an HTTP server 122 on the center server 120 via the Internet or an HTML file stored in the client PC 100 and displaying the interpreted file onto the client PC 100 (CRT 306, which will be explained hereinlater).

As for the HTML file which is obtained from the HTTP server 122, there are a case where it is a file stored on the center server 120 where the HTTP server 122 exists and a case where it is a file which is dynamically formed by a CGI (Common Gateway Interface) program which operates on the center server 120 via the HTTP server 122. For example, when the print order is issued to the center server 120, the thumbnail image is automatically formed in the center server 120 and stored as a file. By obtaining the thumbnail image file from the client 100 via the browser, the thumbnail image can be displayed by the browser 108 of the client 100. When a CGI program which operates on the center server 120 is activated by the client 100 through the HTTP server 122, the preview image is dynamically formed and can be displayed by the browser 108 of the client 100.

The center server 120 in the embodiment has functions for receiving the print order from the client 100 and distributing the print order to be printed to the designated shop 140 in accordance with a type of print order or a print request from the client 100.

The center server 120 receives the print order (including the print data file 104 and print set information 107) from the client 100. If the print order indicates the designation of a real-time print, a control is made so as to download it to the designated shop 140. Specifically speaking, if the designated shop 140 is always connected to the Internet, the print order is transmitted to the shop. If the designated shop 140 is the print shop which is dial-up connected to the Internet, a control is made in a manner such that the print order is stored into a shop folder which a transfer apparatus (transfer means) 125 has and when the center server 120 is accessed from the relevant shop, the print order in the shop holder is transmitted.

The center server 120 receives the attributes of the printer which the shop has and service information of the shop from the shop 140, updates the printer information description file 103 on the basis of the attributes of the printer, and updates and manages the shop information file 106 on the basis of the service information of the shop. In the embodiment, an FTP server 121 which functions as printer information transmitting means and shop information transmitting means has functions for obtaining the printer information description file 103 and shop information file 106 mentioned above (reads out them from memory means) and updating (transmitting) the printer information description file 103 and shop information file 106 to the client 100 which requests for obtaining those files via the Internet.

In the embodiment, the HTTP server 122 functioning as print order receiving means and display image forming means receives the print order including the print data file 104 and print set information 107 from the client 100 via the Internet and stores (uploads) it into the memory means. The HTTP server 122 also forms display image information (in the embodiment, although it is described in an HTML format, the language format is not limited to HTML so long as the language can be displayed by the Web browser) to be displayed by the Web browser 108 of the client 100 on the basis of the thumbnail image 123 which is provided from the center server 120 (having the function of the thumbnail image forming means) or the preview image 124 which is dynamically formed by the preview image forming means, and transmits (downloads) the display image information to the client 100.

Reference numeral 127 denotes print data converting means in the embodiment and converts the print data (postscript data in the embodiment) into a PDF (Portable Document Format) file 126. The print data converting means 127 can be also realized by GhostScript, Adobe Acrobat Distiller, or an application having a similar function. As a PDF file 126, any printer description language file in a format which does not depend on the printer in the shop can be used. In the following description, the PDF file 126 is called a printer description language file. The PDF file 126 and print set information 107 are collectively transferred as a print order 129 to the shop 140.

Reference numeral 128 denotes image converting means (hereinafter, also referred to as an image converter) having functions of thumbnail image forming means and preview image forming means in the embodiment and forms the thumbnail image 123 and preview image 124 from the PDF file 126. The image converter 128 can be also realized by GhostScript, Adobe Acrobat Distiller, or an application having a similar function.

The thumbnail image 123 and preview image 124 are collectively called a display image 130 and are displayed as a display image of a print image onto the Web browser 108 in accordance with a request or used as a check of the print data for display of a print preview by the client.

The PDF file 126 and print set information 107 are transferred as a print order 129 to the shop 140 through the transfer apparatus 125. As mentioned above, the thumbnail image 123 is formed in accordance with the reception of the print order from the client 100 and stored into the memory means, which will be explained hereinlater. The preview image 124 is formed in accordance with the reception of a preview instruction from the client 100.

Reference numeral 125 denotes the transfer means (also referred to as a transfer apparatus) of the invention. The transfer means 125 receives the print set information 107 designated by the client from the HTTP server 122, receives the printer description language file 126 from the print data converting means 127, and manages the print order including the print set information 107 and printer description language file 126 every shop. When the printer description language file 126 is received, the transfer means 125 transmits the print order to the shop which should print and output. The transfer means 125 has a function such that if the print order to instruct a stocking operation has been received, when a print request from the client 100 is received, the print order is stored into a box (folder) for the shop on the output destination side designated by the print order. As mentioned above, the print order is transmitted to the shop 140 which is always connected to the Internet. To the shop which is dial-up connected, when an access from this shop is received, a shop folder which is specified in accordance with an ID of such a shop is searched, and the print order in the searched shop folder is transmitted to the shop.

The shop 140 as a print shop of the embodiment has at least one printer 141 in order to obtain a desired print output of the user in accordance with the print order transmitted from the center server 120. As mentioned above, one or more shops 140 as print shops can exist on the Internet.

One or more printers (in the embodiment, printers for the postscript) 141 are provided for each shop. The shop is a general denomination for the print shop and outputs the printer description language file 126 (in the embodiment, PDF file) to the printer 141 in accordance with the print set information 107 included in the print order. The shop 140 transmits and receives the data asynchronously with the transfer apparatus 125 of the center server 120 via the Internet. The shop 140 arbitrarily communicates with the center server 120 and downloads the data whose printing has been requested into the self shop.

The printer 141 prints the PDF file 126 in accordance with the description of the print set information 107. Since a print control of the printer 141 is a well-known technique, its description is omitted.

(Block Diagram of the Client)

Figure 3:
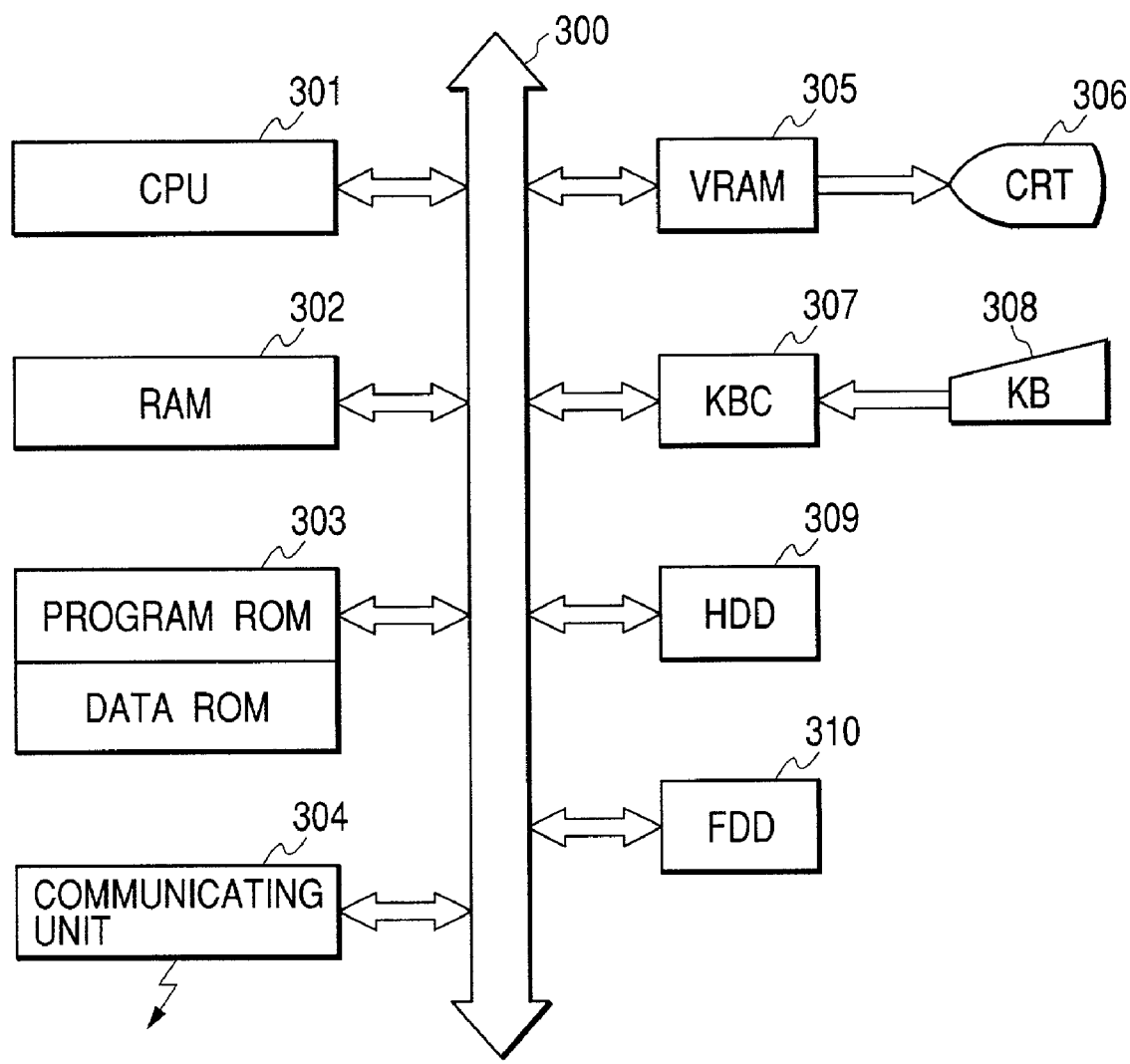
FIG. 3 is a hardware constructional diagram of a client PC as an example of an information processing apparatus of the invention.

FIG. 3 is a block diagram showing a hardware construction of the client 100 as an information processing apparatus of the invention.

In FIG. 3, reference numeral 301 denotes a CPU for controlling the whole apparatus. The CPU 301 can provide various functions by executing arithmetic operating processes on the basis of control programs stored in the memory means. As memory means mentioned here, it is possible to use one of an RAM 302 as volatile internal memory means, an ROM 303 as non-volatile internal memory means, an HDD 309 as external memory means, and an FDD 310 as detachable memory means.

Reference numeral 302 denotes the RAM functioning as a main memory of the CPU 301 and a work area or a temporary refuge area of an executing program. Reference numeral 303 denotes the ROM in which an operation processing procedure of the CPU 301 has been stored. The ROM 303 has: a program ROM in which a system program for controlling equipment of the print server and programs shown by processing flows, which will be explained hereinlater with reference to FIGS. 5 and 6, have been recorded; and a data ROM in which information necessary for operating the system and the like have been stored.

Reference numeral 304 denotes a communicating unit for controlling a data transfer to/from the center server 120 via the Internet. The communication with the center server 120 can be made by connecting it with the Internet of the dial-up using a public line or by connecting it with a proxy server by the LAN by using a dedicated line.

Reference numeral 305 denotes a video RAM (VRAM) for developing an image which is displayed on the screen of the CRT 306 as a display unit showing an operating state of the system and controls the image display.

Reference numeral 307 denotes a keyboard controller (instruction input means) for controlling an input signal from an external input device such as a keyboard or the like. Reference numeral 308 denotes an external input device for receiving the operation. Generally, a keyboard or a pointing device (mouse or the like) is shown.

Reference numeral 309 denotes the hard disk drive (HDD) as external memory means. The HDD 309 is used for storing a document file which is formed by using an application and a document editing apparatus. The printer driver 102 and the shop information 106 of the print shop and the printer information description file 103 which are obtained from the center server as will be explained hereinlater are also stored in the HDD 309.

Reference numeral 310 denotes the removable disk drive (FDD) such as a floppy disk or the like. The FDD 310 is used for reading out an application program, which will be explained hereinlater, from the medium.

Reference numeral 300 denotes an I/O bus (address bus, data bus, and control bus) for connecting the units mentioned above.

(Block Diagram of the Center Server)

Figure 4:
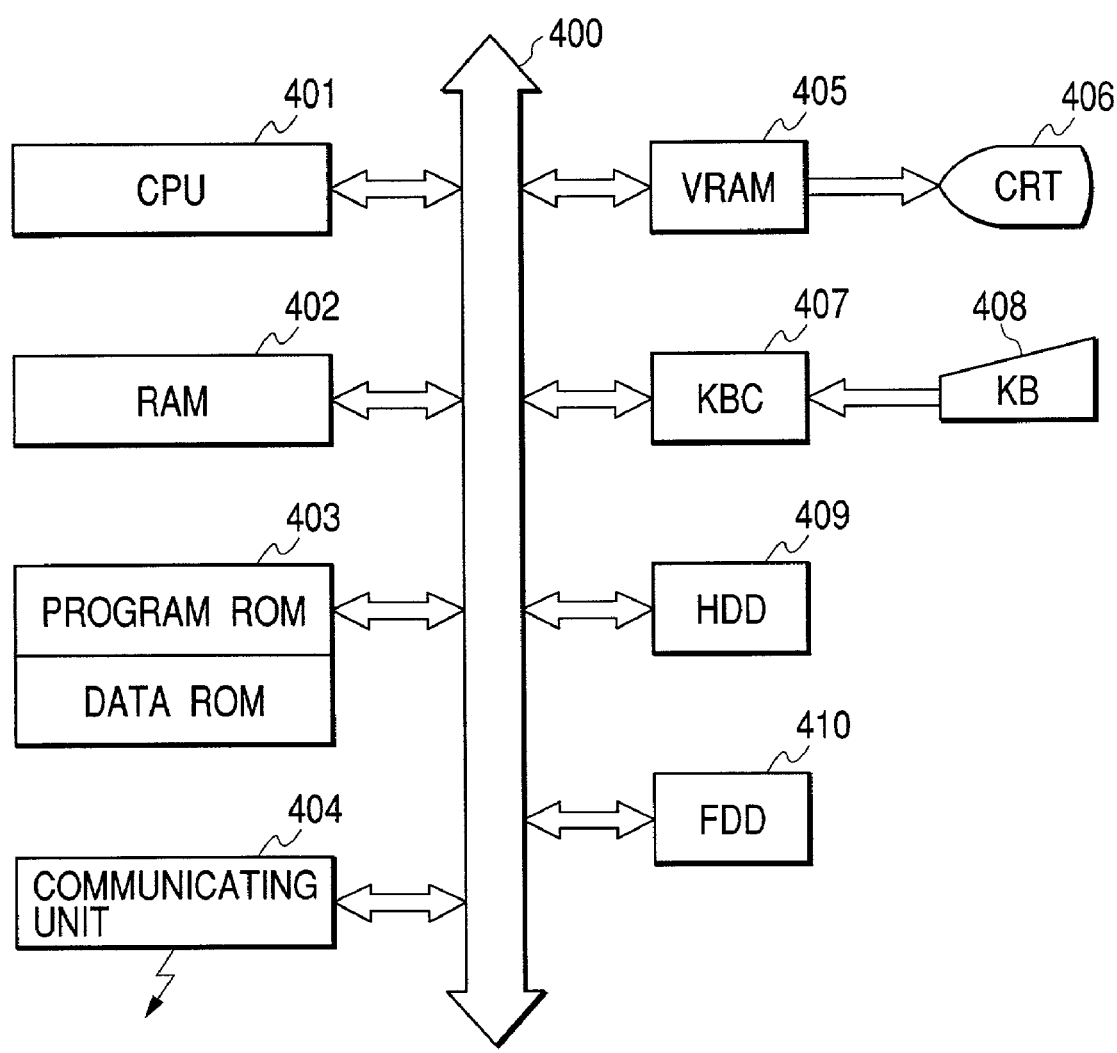
FIG. 4 is a hardware constructional diagram of a center server as an example of a print management apparatus of the invention.

FIG. 4 is a block diagram showing a hardware construction of the center server as a print management apparatus of the invention.

In FIG. 4, reference numeral 401 denotes a CPU for controlling the whole apparatus. The CPU 401 can provide various functions by executing arithmetic operating processes on the basis of control programs stored in the memory means.

Reference numeral 402 denotes an RAM functioning as a main memory of the CPU 401 and a work area or a temporary refuge area of an executing program. Reference numeral 403 denotes an ROM in which an operation processing procedure of the CPU 401 has been stored. The ROM 403 has: a program ROM in which a system program for controlling equipment of the center server 120 and a program shown by a processing flow, which will be explained hereinlater with reference to FIG. 9, have been recorded; and a data ROM in which information necessary for operating the system and the like have been stored.

Reference numeral 404 denotes a communicating unit for performing a control of a data transfer to/from the shop 140, a data control for performing a data transfer between the client 100 and the present system via the Internet, and a diagnosis. Thus, edit information is received from the client 100 and transferred to the print server. The shop information 106 and printer information description file 103 are transmitted to each client.

Reference numeral 405 denotes a video RAM (VRAM) for developing an image which is displayed on the screen of a CRT 406 showing an operating state of the system and controls the image display.

Reference numeral 407 denotes a keyboard controller for controlling an input signal from an external input device such as a keyboard or the like. Reference numeral 408 denotes an external input device for receiving the operation. Generally, a keyboard or a pointing device (mouse or the like) is shown.

Reference numeral 409 denotes a hard disk drive (HDD). The HDD 409 is used for storing an HTTP server program and the print order 129 (PDF 126, print set information 107, etc.). Reference numeral 410 denotes the removable disk drive (FDD) such as a floppy disk or the like. The FDD 410 is used for reading out an application program, which will be explained hereinlater, from the medium. The printer information description file 103 and shop information 106 are also stored in the FDD 410. The print order which is received from the client 100 and the display image (thumbnail image) converted by the image converter 128 are also stored there.

Reference numeral 400 denotes an I/O bus (address bus, data bus, and control bus) for connecting the units mentioned above.

In the center server 120, the HTTP server 122 for transferring the fixed HTML file to the client PC and transferring the HTML file which was dynamically formed by the CGI program stored in the HDD 409 to the client PC in accordance with a request from the client 100 operates.

The HTTP server 122 is made operative by activating an HTTP server program stored on the HDD 409. The HTTP server 122 in the operative state is developed onto the client 100 via the network so that the print order information can be viewed and selected on the client PC 100 and the print order can be executed via the network.

(Flowchart for the Print Order Forming Process)

Figure 5:
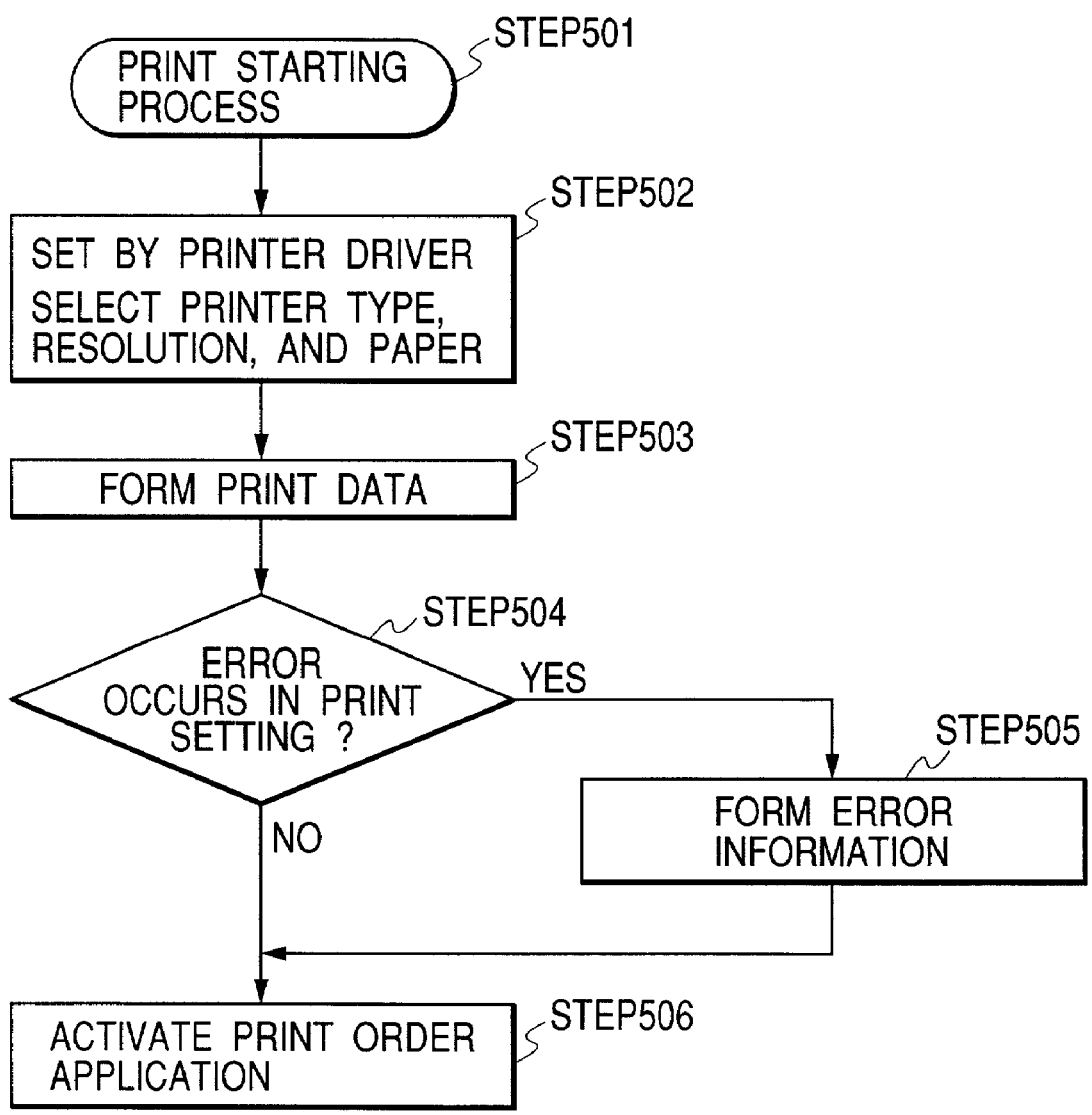
FIG. 5 is a flowchart for explaining a print data forming process in the information processing apparatus of the invention.
Figure 6:
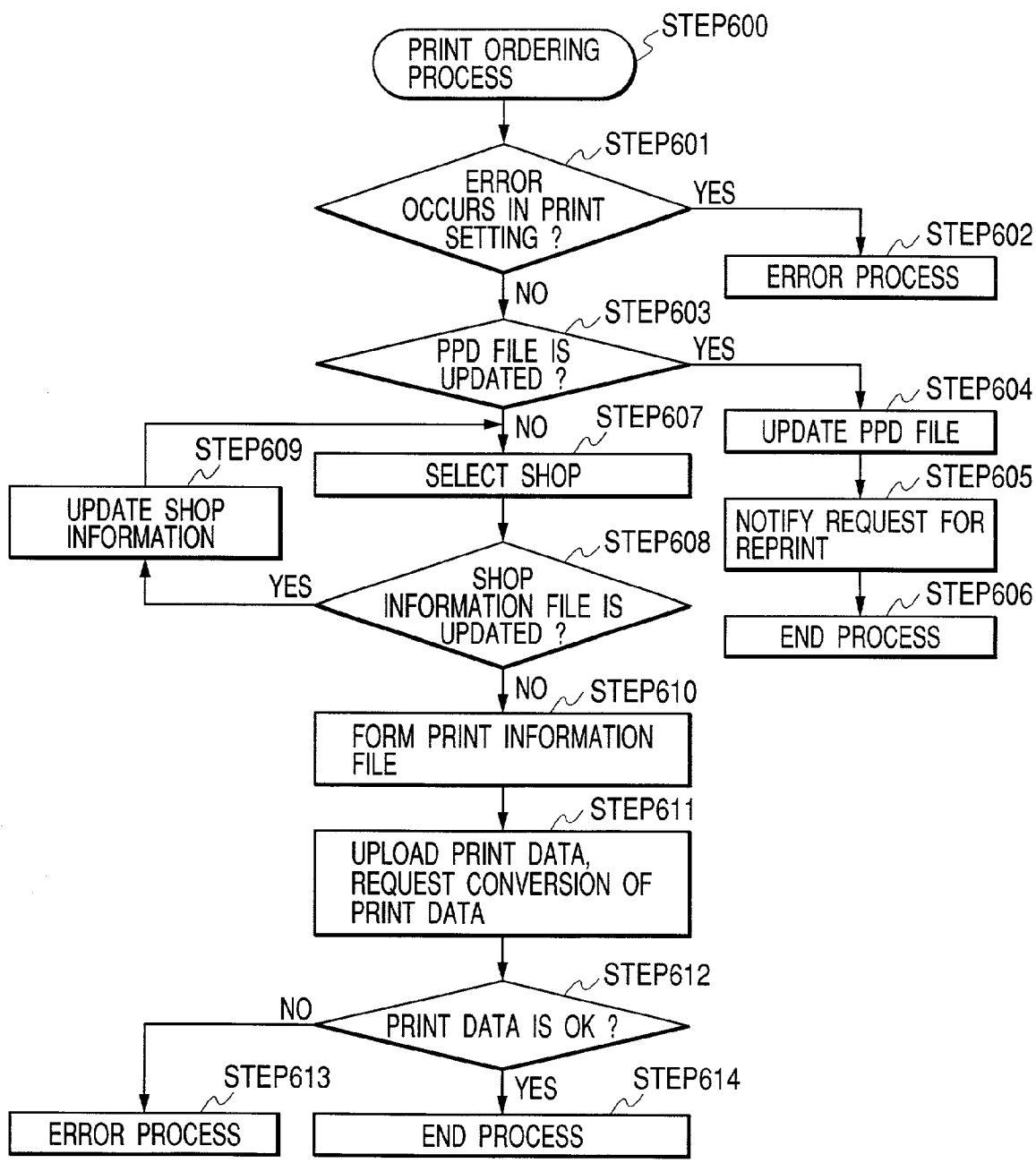
FIG. 6 is a flowchart for explaining an uploading process of a print order in the information processing apparatus of the invention.

FIGS. 5 and 6 are flowcharts for explaining a control of a print starting process and a print ordering process in the client 100 according to the embodiment of the information processing apparatus of the invention. The control of the client 100 will be described hereinbelow with reference to those flowcharts. In each client 100, the CPU 301 executes the arithmetic operating processes on the basis of the control programs stored (installed) in the HDD 309 or program ROM 303 so that it can be executed, thereby enabling the control to be realized.

In the processes based on the flowchart shown in FIG. 5, the following print starting process is executed by the printer driver 102.

First, if a "print" menu is selected by the operator when the application 101 is activated on the OS of the client PC, the printer driver 102 is activated by the function of the OS and the print starting process is executed in STEP 501. In STEP 502, the printer driver 102 forms a user interface for allowing the user to designate the selection of the printer type, the resolution, and the paper or the like with reference to the printer information description file 103, allows the user interface to be displayed, and executes a setting process by setting the print setting designated by the user as a print setting of the print job.

In subsequent STEP 503, the printer driver 102 forms the print data 104 (in the embodiment, postscript data) by converting a draw function which is inputted from the application 101 via the OS on the basis of the print set value which has been set in STEP 502. The draw function which is inputted to the printer driver 102 is a draw function which is formed by converting a first draw function (draw function which is defined by the OS: for example, a GDI function in Windows) which is supplied from the application to the drawing means of the OS into a second draw function (draw function which is defined by a DLL file of a device driver: for example, a DDI function in Windows) which can be interpreted by the device driver.

In STEP 504, the printer driver 102 discriminates the presence or absence of an error of the print setting and discriminates whether the formed postscript data is correct or not. If there is an error, the printer driver 102 forms error information in STEP 505.

If there is no error in STEP 504 or if the error information is formed in STEP 505, the printer driver 102 promotes so as to activate the print order application 105 via a monitor in subsequent STEP 506. The print order application 105 executes the print ordering process shown in subsequent FIG. 6.

According to the processes based on the flowchart shown in FIG. 6, the following print ordering process is executed by the print order application 105.

When the print order application 105 is activated via the monitor by an instruction from the printer driver 102, the print ordering process in STEP 600 is started. In STEP 601, the print order application 105 discriminates the presence or absence of the error information formed by the error process (STEP 505) of the printer driver described before. If there is an error, the processing routine advances to STEP 602. The print order application 105 notifies the user of the error information and the processing routine is finished.

If there is no error, in STEP 603, the print order application 105 is connected to the center server 120 through the Internet and inquires the center server 120 about whether the printer information description file 103 (in the embodiment, PPD file) has been updated or not. In the center server 120, in accordance with an inquiry sent from the client, the version of the printer information description file which the client has is compared with that of the latest printer information description file which the center server 120 has. If the printer information description file has been updated, a URL in which the printer information description file exists is added and the information is converted as a printer information description file into a file in a format which can be interpreted by the print order application 105, for example, the HTML format, and the client 100 is notified of the converted file.

If printer description file updating information showing that the printer information description file has been updated is notified by the center server 120, in STEP 604, the print order application 105 accesses the notified URL and downloads the latest printer information description file 103 via the FTP server 121 on the center server 120, thereby updating the printer information description file. When the printer information description file is updated, the print setting of the printer driver performed by the print starting process shown in the flowchart of FIG. 5 and the formed print data are invalidated. Therefore, the user is notified of an instruction to execute a print command again in STEP 605. The processing routine is finished in STEP 606.

If a message showing that the printer information description file is not updated is notified, the print order application 105 forms a user interface for selecting a printable shop (that is, a shop which can execute the printing operation) with reference to the shop information file 106 downloaded to the client 100 and allows the user interface to be displayed. By allowing the user to select the printable shop, a selecting instruction of the user is received. Although all shops which are defined by the shop information file 106 stored in the client are displayed, such a shop selecting user interface discriminates whether the print data formed by the printer driver 102 can be printed and outputted or not, and also displays a discrimination result. The discrimination about whether the print data can be printed and outputted or not can be realized by a method whereby the print order application 105 discriminates whether each shop has prepared the corresponding printer by the device dependent print setting (paper size, resolution, paper direction, ink kind, etc.) which is designated by the user by a property UI of the printer driver 102 or not with reference to the shop information 106. The shop selecting UI will be explained hereinlater with reference to FIG. 7.

When the shop is selected by the user in STEP 607, in STEP 608, the print order application 105 inquires the center server 120 about whether the shop information file 106 of the selected shop has been updated or not via the Internet. In the center server 120, in accordance with the inquiry sent from the client, the version of the shop information file which the client has is compared with that of the shop information file of the relevant shop which the center server has. If the information has been updated, the URL in which the shop information file exists and the file name are added and the information is converted as shop information updating information into a file in a format which can be interpreted by the print order application 105, for example, the HTML format, and the client 100 is notified of the converted file.

If the shop information updating information showing that the shop information file has been updated is notified by the center server 120, in STEP 609, the print order application 105 accesses the notified URL and downloads the latest shop information file via the FTP server 121 on the center server 120, thereby updating the shop information file. When the shop information file is updated, since there is a possibility that the printer and printer option have been changed, the shop selection in STEP 607 is again executed in order to discriminate whether the present print order can be executed or not.

If a message showing that the shop information file is not updated is notified, the print order application 105 forms the print set information file 107 in STEP 610. As mentioned above, the ID of the shop on the print destination side which is specified from the shop information 106 corresponding to the shop which is selected by the user and the print paper size, printer name, the number of copies, and the like as a print setting selected by the user by the UI according to the printer information description file 103 are described in the print set information file 107.

In STEP 611, the print order application 105 forms a GUI (hereinafter, referred to as a user interface) shown in FIG. 13 on the basis of the information collected in each of the foregoing processing steps, sends GUI information to the OS, and develops it into the VRAM 305 by using a display driver (not shown), thereby allowing the CRT 306 serving as a display unit to display the user interface.

The user interface screen shown in FIG. 13 will now be described. FIG. 13 is a diagram showing an example of an operating screen of the print order application 105 which operates on the client PC 100. In the diagram, reference numeral 1301 denotes a page picture plane to instruct for uploading the print order formed by the print order application 105 into the center server 120. Reference numeral 1302 denotes a user ID (information for identifying the user: also referred to as user identification information) corresponding to the user name. The user ID is an ID which has previously been issued from the center server to the client in order to specify the user who accessed the center server. This ID differs every user. Reference numeral 1303 denotes information showing the shop which prints and outputs the print order. The shop name of the shop designated by the user selection in STEP 607 is displayed. Reference numeral 1304 denotes a name of the print data in the print order, and 1305 to 1309 indicate instruction items, respectively. When the user presses a button corresponding to one of the instruction items, a process according to the print order application is executed on the client PC. Reference numeral 1305 denotes a "PROPERTY" button. When the user presses this button, details of the print order, for example, the number of pages, the number of copies, a paper size, a resolution, a designation of finishing, a kind of recording material (toner or ink), and the like are displayed by different windows, respectively. Reference numeral 1306 denotes a "REAL-TIME ORDER" button. When the user presses this button, the present print order becomes the real-time print order, the print order is uploaded to the center server 120, and the print order is issued from the center server 120 to the shop. Reference numeral 1307 denotes an "UPLOAD" button. When the user presses this button, the print order is uploaded to the center server 120. Reference numeral 1309 denotes a "CANCEL" button. When the user presses this button, a page screen for selecting "UPLOAD" of the print order is finished, and the screen is returned to the previous page screen. Reference numeral 1308 denotes a "PREVIEW" button. When the user presses this button, an HTML obtaining request for preview is issued from the Web browser 108 to the HTTP server 122. In the center server 120, as a result of the CGI program, display data in the HTML format including the preview image 124 is formed and transferred to the client 100. A preview image is displayed to the Web browser 108 of the client. Reference numeral 1309 denotes the "CANCEL" button. When the user presses this button, the present print ordering process is interrupted.

Figures 12, 13:
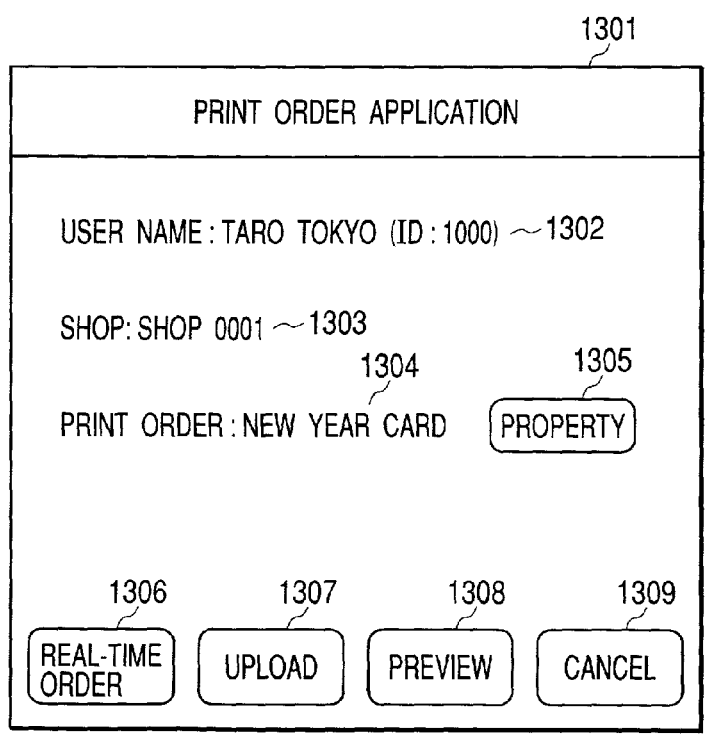
FIG. 12 is a diagram showing an example of a print order management table showing correspondence of a print order, a print order pass, and a display image pass.
FIG. 13 is a diagram showing an example of a user interface screen upon print order uploading which is displayed to the client.

Therefore, in STEP 611, the print order application 105 discriminates whether the user has selected one of the "REAL-TIME ORDER", "UPLOAD", and "CANCEL" buttons in the user interface of FIG. 13. If it is determined that "REAL-TIME ORDER" has been selected, the print set information file 107 and print data 104 are set to the print order, a flag showing the real-time print order is set to the high level, and the print order is uploaded to the center server 120 via the Internet. If it is determined that "UPLOAD" has been selected, the print order application 105 uploads the print order as a normal print order into the center server 120 via the Internet. Simultaneously with the print order, the print order application 105 issues a request command for changing the uploaded print data 104 (in the embodiment, postscript data) to the PDF file 126 and an error check request command of the print order 129 to the center server 120. If it is determined that "CANCEL" has been selected, the processing routine is finished or returned to a shop selecting process (STEP 607).

In STEP 612, the print order application 105 inquires the center server 120 via the Internet about the presence or absence of a conversion error which is caused when the print data is converted into a printer description language file (as mentioned above, a file in a data format which does not depend on the shop; in the embodiment, PDF file) by the print data converting means 127, a conversion error which is caused when the printer description language file 126 is converted into image data (display image 130) by the image converter 128 (image converting means), or an error of the print set information. If there is an error, in STEP 613, the print order application 105 notifies the user of the error information and finishes the processing routine. If there is no error, in STEP 614, the print order application 105 of the client receives a notice of an order ID (which will be explained hereinlater) to specify the print order from the center server 120, executes a finishing process such as deletion or the like of the print order which has been uploaded to the center server 120 and became unnecessary, and finishes the processing routine.

Figures 7, 8:
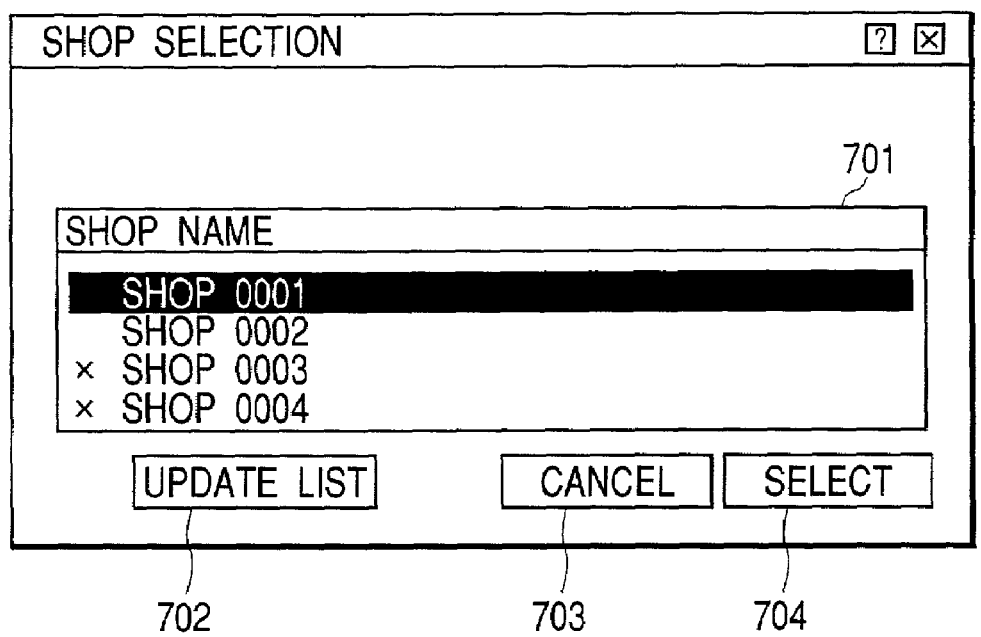
FIG. 7 is an explanatory diagram of a shop selection dialog at the time of formation of a print order which is displayed to a client.
FIG. 8 is a diagram showing an example of a data structure in a shop information file.

FIG. 7 shows an example of a GUI (Graphical User Interface) for performing the shop selection in STEP 607 in the flowchart shown in FIG. 6. This GUI is formed by the print order application 105 and displayed on the CRT 306 as a display unit via the OS. Reference numeral 701 denotes a list area for displaying a list of the shop names which are displayed in accordance with the shop information file 106 existing in the client 100. As mentioned above, the list of the names of the shops which can output in accordance with the print setting by the printer driver is displayed. The user can select one of the shops in this list. A "x" mark is displayed in the list of the names of the shops which cannot print and output the present print data, or such a list is displayed in gray-out manner or the like, thereby disabling the user to erroneously select the unprintable shop.

Reference numeral 702 denotes an "UPDATE LIST" button. When the user presses this button, the print order application 105 updates the shop information file 106 regarding the shop selected from the shop list by downloading the latest shop information file 106 existing on the center server 120 from the center server 120. By clearly updating the shop information file 106 by the user during the shop selecting process, in STEP 608 in the flowchart shown in FIG. 6, the shop information file has already been updated, so that a discrimination result is always NO and it is avoided that the processing routine is returned to the shop selecting process. Reference numeral 703 denotes a "CANCEL" button, the shop which was selected recently is selected, and the shop selecting process is finished. Reference numeral 704 denotes a "SELECT" button. When the user presses this button, the print order application 105 selects the shop selected in the list area 701 of the shops as a shop which executes the printing process of the print order. The shop selecting process is finished.

FIG. 8 shows an example of the shop information file 106 held in the center server 120 or the shop information file 106 downloaded in the client 100, and both of them have the same data structure.

Reference numeral 801 denotes shop name information showing the name of the shop corresponding to the shop name displayed in the list area of the shops in FIG. 7. Reference numeral 802 denotes shop ID information for distinguishing the shop. The print order application 105 inserts the shop ID into the print set information. The center server 120 extracts the shop ID with reference to the print set information 107 in the print order 129 and searches the shop having the same shop ID by the shop information 106 held by itself, thereby making it possible to specify the shop to print and output the print order, in other words, the shop to request the printing.

Reference numeral 803 denotes version information of the shop information file. The version information 803 is used in the process for discriminating whether the print order application 105 should execute the updating process in STEP 608 in the flowchart shown in FIG. 6 or not. Reference numeral 804 denotes shop information in which information of the shop such as address, holiday, and the like of the shop has been stored. Reference numeral 805 denotes printer list information in which names of the printers which can be used in the shop have been stored. Reference numeral 806 denotes paper size list information in which a list of the paper sizes which can be selected by the printer shown in the printer list information 805 has been stored. Reference numeral 807 denotes printer option parameter information in which printer option information such as single/duplex print and the like and parameter information such as a print margin and the like of the printer which can be selected by the printer function have been stored. The paper size list information 806 and printer option parameter information 807 can be also described as information of each printer into the printer information description file 103. The error discriminating process of the printer driver 102 in STEP 504 in the flowchart shown in FIG. 5 is executed on the basis of either the information in the printer information description file 103 or the information in the shop information 106.

(Flowchart for the Shop Information Obtaining Process in the Client)

A process for downloading the shop information from the center server 120 to the client 100 will now be described. According to the invention, the shop including the printer which is specified by the using conditions of the user is selected without downloading all of the shop information from the center server 120, and the shop information 106 corresponding to the selected shop is downloaded from the center server 120 to the client 100.

Figure 15:
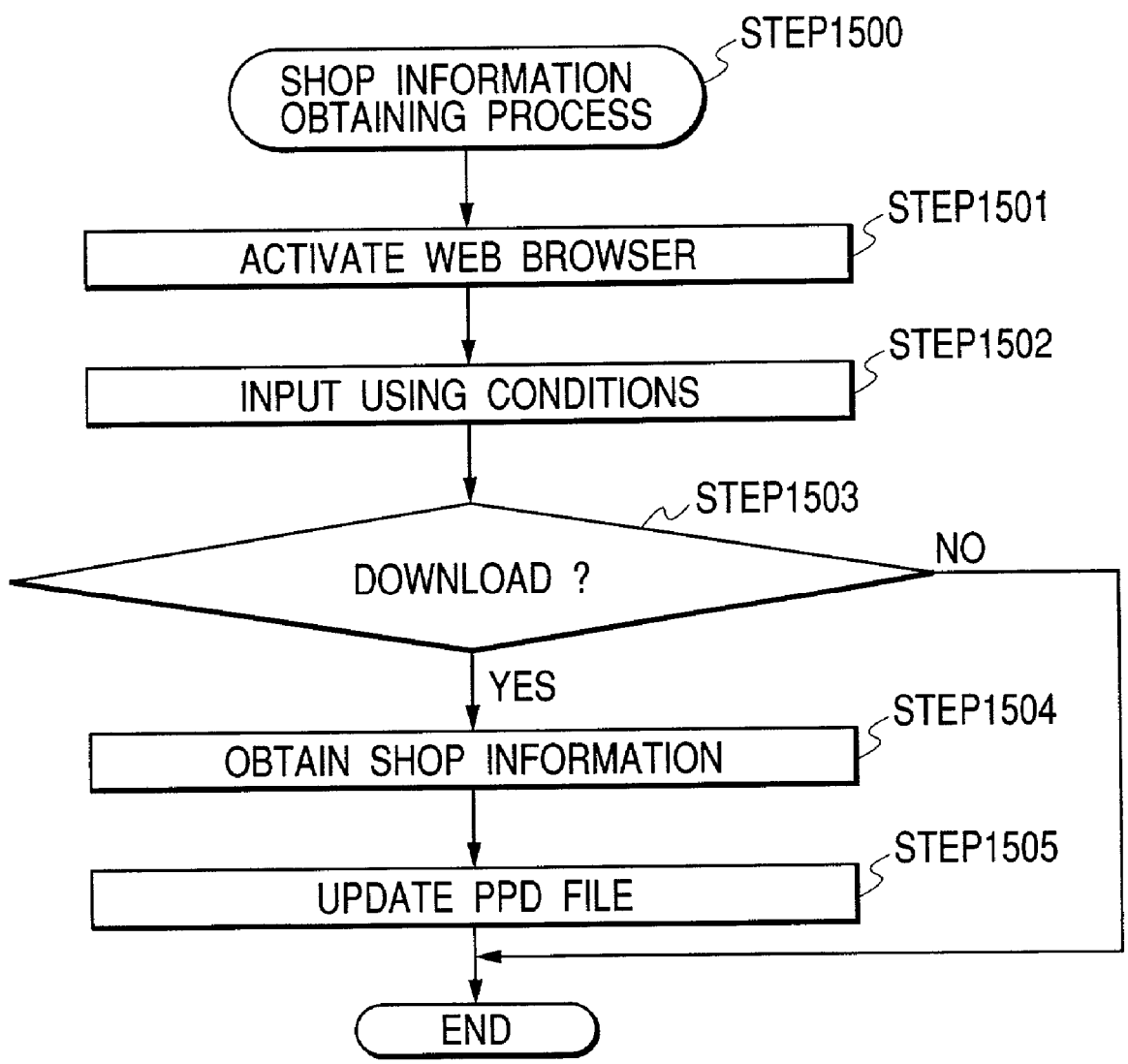
FIG. 15 is a flowchart for explaining a shop information obtaining process in the information processing apparatus of the invention.

FIG. 15 is a flowchart for the shop information obtaining process in the client 100. The client 100 can realize the present control by a method whereby the CPU 301 executes the arithmetic operating processes on the basis of the control programs stored (installed) in the HDD 309 or program ROM 303 so that it can be executed.

According to this process, in the print order application 105, the user instructs an "OBTAIN SHOP INFORMATION" button (not shown), so that a process in STEP 1500 is started. In STEP 1501, the print order application 105 instructs the OS to activate the Web browser 108, thereby making the Web browser 108 operative by the client 100. At this time, a URL is designated and the Web browser 108 accesses the designated URL (center server 120) via the Internet, obtains display information as a result of a CGI program, and allows a GUI shown in FIG. 14 to be displayed onto the display unit.

FIG. 14 is a screen diagram for explaining a user interface of a using condition input page of the shop which is displayed and operated by the Web browser 108 on the client PC 100. By requesting the center server 120 to execute the CGI program, the HTTP server 122 on the center server 120 transfers the data in the HTML format to the client PC as a result of the CGI program. By displaying the data in the HTML format as a page by the Web browser 108 on the client PC, the display and operation on the Web browser 108 are enabled. Although the embodiment has been described on the assumption of the data in the HTML format, there is no need to limit the data format to the HTML format, any data format can be used so long as it can be displayed by Internet viewing software (browser or the like).

In FIG. 14, reference numeral 1401 denotes a using condition input page of the shop which is displayed on the Web browser 108 of the client 100 on the basis of the image information which has been formed and transferred by the center server 120. Reference numerals 1402 to 1405 denote check box formats and 1406 indicates a selection item of a pulldown menu format. That is, each of them is a using condition item.

Reference numeral 1402 denotes the check box for designating a paper size as a using condition. The user can designate one or more of a plurality of check boxes. The printer having at least one paper size which is designated here becomes the target printer.

Reference numeral 1403 denotes the check box for designating a media type as a using condition. The user can designate one or more of a plurality of check boxes. The printer having at least one media type which is designated here becomes the target printer.

Reference numeral 1404 denotes the check box for designating a page layout as a using condition. As for this item, the user checks only the item (function) which is certainly used by the print order. Only the printer having the page layout function which is designated here becomes the target printer.

Reference numeral 1405 denotes the check box for designating a finishing as a using condition. Also as for this item, the user checks only the item (function) which is certainly used by the print order. Only the printer having the finishing function which is designated here becomes the target printer.

Reference numeral 1406 denotes the pulldown menu for designating a region designation as a using condition. It is also possible that this item is not selected. When a region is designated, the shops existing in the designated region are excluded from selection targets.

Reference numeral 1407 denotes a "DOWNLOAD" button. When the user presses this button, the Web browser 108 issues a downloading request to the HTTP server 122 on the center server 120 via the Internet by using the using conditions designated by the user as an argument. Reference numeral 1408 denotes a "CANCEL" button. When the user presses this button, the processing routine is finished.

As mentioned above, the user interface screen of FIG. 14 is displayed onto the display unit. In STEP 1502, via the user interface, the Web browser 108 executes an inputting process of the using conditions which are designated by the user. In STEP 1503, the Web browser 108 discriminates whether the "DOWNLOAD" button 1407 has been pressed by the user or not. If it is determined that there is a downloading request, the processing routine advances to STEP 1504. If it is determined that there is not a downloading request, in other words, if it is decided that the "CANCEL" button 1408 has been pressed by the user, the processing routine is finished.

In STEP 1504, the Web browser 108 obtains the shop information file 106 as a first candidate searched on the basis of the foregoing using conditions from the center server 120. In STEP 1505, the printer information description file 103 is downloaded as necessary. After completion of each downloading process, the shop information obtaining process in the client 100 is finished.

(Flowchart for the Shop Information Transferring Process in the Center Server)

FIG. 16 is a flowchart for explaining a control which is performed when a shop information transferring request including the using conditions from the client 100 in the center server 120 is received. The center server 120 can realize the present control by a method whereby the CPU 401 executes the arithmetic operating processes on the basis of the control programs stored (installed) in the HDD 409 or program ROM 403 so that it can be executed.

In the client, the using condition items 1402 to 1406 on the Web browser 108 are set. In STEP 1503, when the "DOWNLOAD" button 1407 is pressed by the user, the shop information transferring process in STEP 1600 is started. In STEP 1601, a login process of the client is executed. The center server 120 discriminates whether a user ID and a password which are inputted from the client 100 via the Internet coincide with those in the user information file (stored in the HDD 409) managed by the center server 120 or not. If the inputted user ID and password are correct, the center server 120 permits an access to the client 100 which requested the access, a communication session is held, and STEP 1602 follows. In case of the user who accesses for the first time, a user registering process is executed. In the center server 120, the user ID which is issued to the user of the client and the password which is inputted from the user of the client are registered into the user information file and managed. A cookie information file describing the user ID and the like is held in the HDD 309 of the client PC 100.

In STEP 1602, the center server 120 executes an inputting process of a downloading request including the using conditions from the client 100 via the Internet. In STEP 1603, the center server 120 analyzes the using conditions included in the received downloading request and searches the shop having the printer adapted to the using conditions from all of the shop information managed in the center server 120. According to the searching process, as for the using conditions 1402 and 1403, the printer having at least one or more corresponding items in each condition becomes the target printer. As for the using conditions 1404 and 1405, the printer which satisfies those conditions becomes the target printer. The shop information of the print shop having the target printer is searched and decided as shop information of the first candidate. If the region was designated in the check box 1406, the shops are further narrowed down to the shops existing in such a region. In the data structure of the shop information file 106, an address of the shop is included in the shop information 804 as mentioned above in FIG. 8, so that it is possible to discriminate whether the shop exists in the designated region or not.

If the first candidate of the shop information is determined in STEP 1603, in STEP 1604, the FTP server 121 of the center server 120 transfers the shop information of the first candidate to the client 100 via the Internet and the client 100 stores the downloaded shop information into the pass of predetermined memory means and manages it.

In STEP 1605, when the shop information file 106 is newly downloaded into the client 100, whether the printer information description file 103 of the printer which the downloaded shop information has is managed in the client 100 or not is inquired. When the obtaining request is received from the client 100, the FTP server 121 of the center server 120 transfers the printer information description file 103 to the client 100.

As mentioned above, the center server 120 searches the adapted shop on the basis of the using conditions received from the client 100 and transfers the shop information 106 of the searched shop to the client 100. Therefore, since the client 100 manages the shop information which the user desires, high use efficiency is obtained. Further, since there is no need to manage the unnecessary shop information, memory use efficiency is also improved.

(Flowchart for the Control Process in the Center Server)

Figure 9:
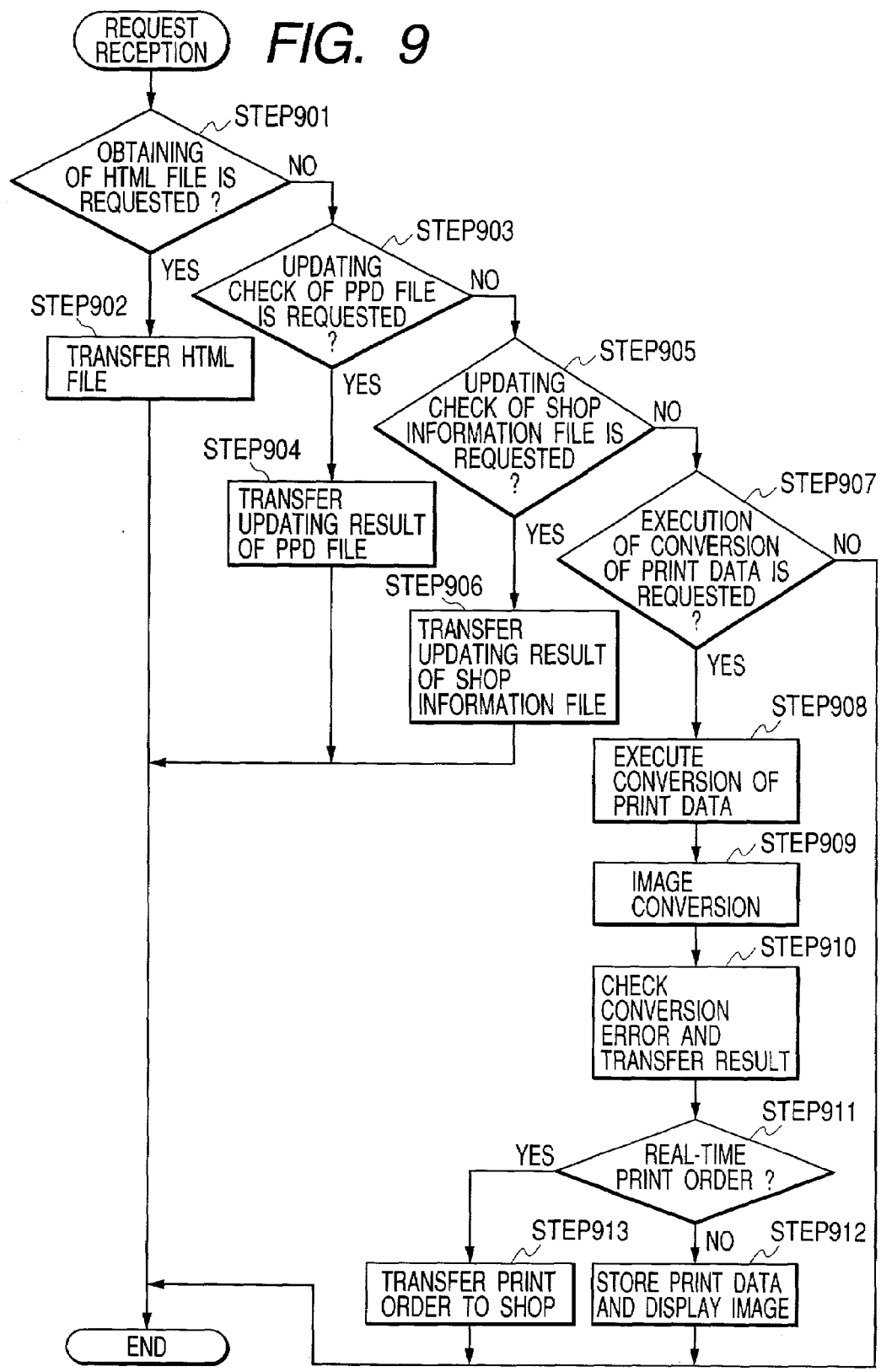
FIG. 9 is a flowchart for explaining a request receiving process in the print management apparatus of the invention.

FIG. 9 shows a flowchart for explaining a control which is executed when a request from the client 100 in the center server 120 is received. The control process is executed in the center server 120 in the case where the following requests are executed in the client 100: that is, the "HTML file obtaining request" of the Web browser 108; the "updating checking request for the printer information description file" which is performed in STEP 603 of the processing flow of the client in FIG. 6; the "updating checking request for the shop information file" which is performed in STEP 608; and the "print data converting request" which is performed in STEP 611. The control of the center server 120 will be described hereinbelow with reference to the flowchart. The center server 120 can realize the present control by a method whereby the CPU 401 executes the arithmetic operating processes on the basis of the control programs stored (installed) in the HDD 409 or program ROM 403 so that it can be executed.

Figure 10:
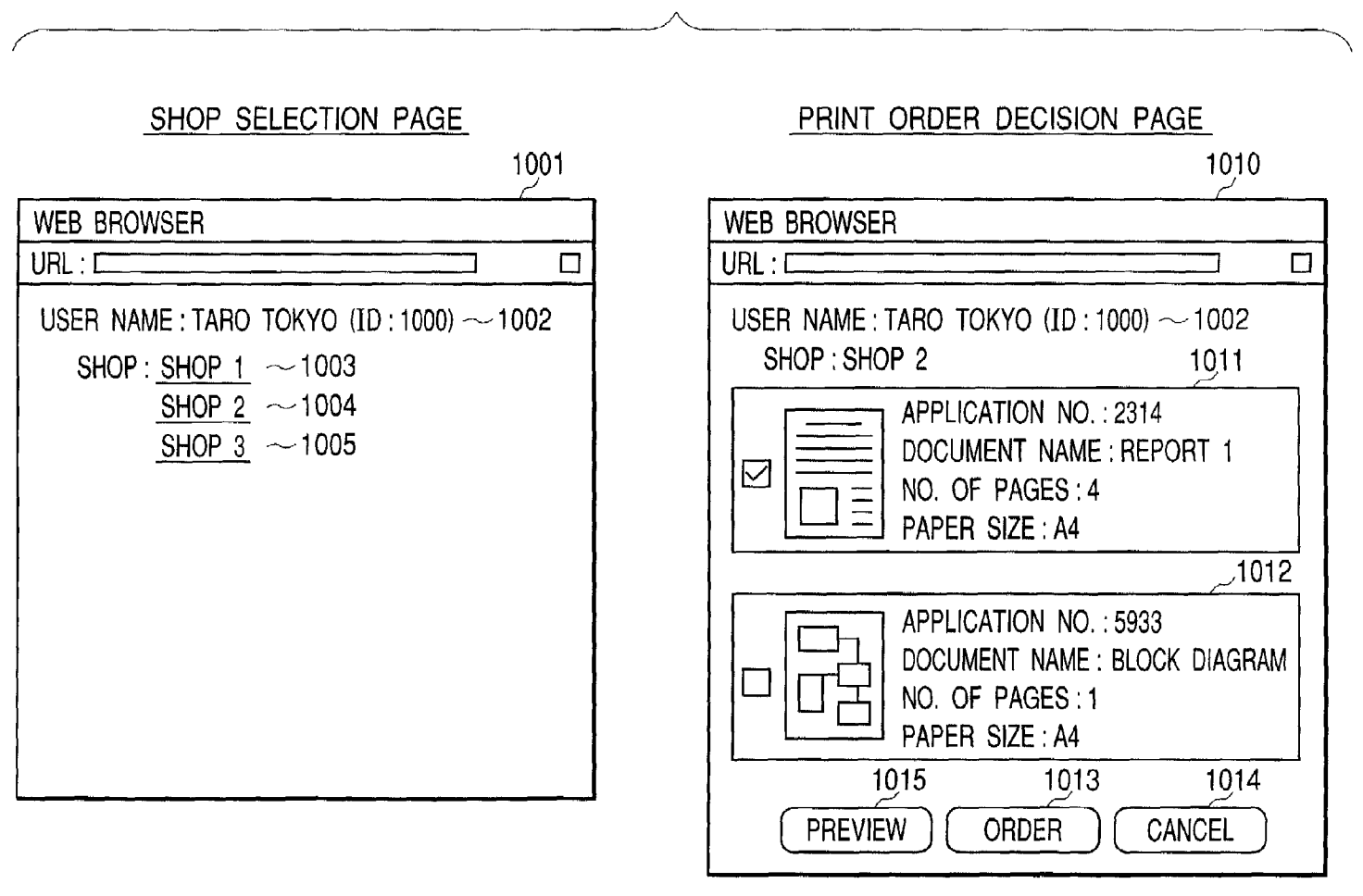

When the request from the client 100 is received, in STEP 901, the HTTP server 122 discriminates whether the request is the obtaining request for the HTML file or not. If it is determined that the request is the obtaining request for the HTML file, the processing routine advances to STEP 902. If it is determined that the request is not the obtaining request for the HTML file, the processing routine advances to STEP 903. When accessed as a "PREVIEW" request (the "PREVIEW" button 1308 in FIG. 13 is instructed by the user) from the print order application 105 on the client PC 100 and when accessed as an obtaining request for the "shop selection page" or "print order decision page" from the Web browser 108, since the request is the obtaining request for the HTML file, the processing routine advances to STEP 902. The obtaining request for the HTML file also includes a request for displaying the print order which has already been received (uploaded) from the client 100 which requested the access (in the case where a "PREVIEW" button 1015 in FIG. 10 is instructed by the user). If the updating checking request for the printer information description file or the updating checking request for the shop information file is issued from the print order application 105, since this request is a CGI program executing request, the processing routine advances to STEP 903.

In STEP 902, the HTTP server 122 transfers the HTML file corresponding to the URL of the HTML file included in the obtaining request for the HTML file to the client PC 100 on the requesting source side. If the obtaining request for the HTML file is a request for executing the CGI program, the HTTP server 122 on the center server 120 transfers the data in the HTML format to the client PC as a result of the CGI program. This process corresponds to the case of searching the print order from the client or the case of allowing the display image to be included in the HTML file.

In STEP 903, the HTTP server 122 discriminates whether the request from the print order application 105 is the updating checking request for the printer information description file 103 or not. If NO, the processing routine advances to STEP 905. If it is decided that the request is the updating checking request for the printer information description file 103, the processing routine advances to STEP 904. In STEP 904, the HTTP server 122 on the center server 120 compares the version of the printer information description file (PPD file) designated to the executing request for the CGI program from the print order application 105 with that of the latest printer information description file which is updated on the center server 120, and transfers the HTML file which is outputted as a result to the client PC 100 on the requesting source side. If the printer information description file has been updated, a list of the URLs of the printer information description files to be downloaded is included in the HTML file which is transferred as a result.

In STEP 905, the HTTP server 122 discriminates whether the request from the print order application 105 is the updating checking request for the shop information file 106 or not. If NO, the processing routine advances to STEP 907. If it is decided that the request is the updating checking request for the shop information file, the processing routine advances to STEP 906. In STEP 906, the HTTP server 122 on the center server 120 compares the version of the shop information file which has been designated to the executing request for the CGI program from the print order application 105 and which corresponds to the shop name or shop ID sent as an argument with that of the latest shop information file of the same shop which is updated on the center server 120, and transfers the HTML file which is outputted as a result to the client PC 100 on the requesting source side. If the shop information file has been updated, a list of the URLs of the shop information files to be downloaded is included in the HTML file which is transferred as a result.

In STEP 907, the HTTP server 122 discriminates whether the request from the print order application 105 is the print order uploading request, in other words, the print data converting request or not. If NO, the processing routine is finished. If it is decided that the request is the print data converting request, the processing routine advances to STEP 908. In STEP 908, the printer description language file (in the embodiment, PDF file) is formed from the print data (in the embodiment, postscript data) by the print data converting means 127. As mentioned above, the print data converting means 127 can be realized by GhostScript, Adobe Acrobat Distiller, or an application having a similar function. In STEP 909, a thumbnail image of low resolution and a display image of a preview image of high resolution are formed by the image converter 128 from the PDF file as a printer description language file. The image converter 128 can be also realized by GhostScript, Adobe Acrobat Distiller, or an application having a similar function.

In STEP 910, the center server 120 discriminates whether an error has been caused due to the conversion in STEP 908 and STEP 909 or not. If there is an error, the center server 120 adds error information to the HTML file which is outputted as a result and transfers the resultant HTML file to the client PC 100 on the requesting source side. If there is no error, the HTML file showing the fact that the converting process of the print data has correctly been performed is transferred to the client PC 100 on the requesting source side.

In STEP 911, whether the print order which was uploaded from the client is the "real-time print order" or the "normal print order" is discriminated by checking whether the real-time print flag has been set to the high level or not. If it is determined that the print order is the real-time print order, the processing routine advances to STEP 913. If it is determined that the print order is the normal print order, the processing routine advances to STEP 912.

In STEP 912, the print data converting means 127 of the center server 120 stores the printer description language file 126 formed in STEP 908 and the HTTP server 122 stores the print set information file 107 received from the client, as print order 129 for shop transfer, into a print order management table (FIG. 12) in the transfer means 125 on the center server 120. At this time, the HTTP server of the center server 120 transfers an order ID, as additional information, for specifying the print order 129 to the client PC 100. In the process in STEP 910, the thumbnail image 123 and preview image 124 are stored as a display image 130 into the print order management table (FIG. 12) on the center server 120, which will be explained hereinlater.

If it is decided that the print order is the real-time print order, in STEP 913, the print data converting means 127 stores the printer description language file 126 formed in STEP 908 and the HTTP server 122 stores the print set information file 107 received from the client, as real-time print order 129 for shop transfer, into the print order management table (FIG. 12) in the transfer means 125 on the center server 120. At this time, the thumbnail image 123 and preview image 124 are similarly stored into a print order correspondence table. As mentioned above, if the shop which should print and output the print order is a shop which is normally connected to the Internet, the transfer means 125 transmits the print order to the relevant shop and requests the printing, and if the shop which should print and output the print order is a shop which is dial-up connected to the Internet, the print order is stored into a box (folder) for the relevant shop, thereby managing the print order so that it can be downloaded when there is an access from the relevant shop. The center server 120 manages information showing whether the shop is normally connected or dial-up connected to the Internet so that it is included in the shop information 106. When the real-time print order is uploaded or when a print order request for the normal print order is made, whether the print order 129 is transmitted and the print is requested or the print order is managed so that it can be downloaded into the box (folder) corresponding to the shop can be discriminated by referring to the shop information 106.

As mentioned above, in the center server 120, since the print order is converted into the printer description language file (in the embodiment, PDF file) as a format which does not depend on the printer in the shop and held, in the shop which should print and output the print order, it is sufficient that general application and printer driver which can handle the printer description language file (PDF file) are used. Since the apparatus of the invention easily operates in the present personal computer and the application and printer driver are software which can be easily obtained, there is an effect such that a load on the shop side is fairly reduced.

The thumbnail image 123 is used on an operation page (FIG. 10) of the print order which is displayed and operated by the Web browser 108 of the client 100, which will be explained hereinlater. The preview image 124 is used for preview drawing as an image for checking the print data.

(Explanatory Diagram of the Print Ordering Process)

FIG. 10 is a screen diagram for describing a user interface of the shop selection page and print order decision page (upon execution of the print order) which are displayed and operated by the Web browser 108 on the client PC 100. By requesting the center server 120 to execute the CGI program as mentioned above, the HTTP server 122 on the center server 120 transfers the data in the HTML format to the client PC as a result of the CGI program. By displaying the data in the HTML format as a page by the Web browser 108 on the client PC, the display and operation can be performed on the Web browser 108. Although the embodiment has been described on the assumption that the data is the data in the HTML format, the data format is not limited to the HTML format but any data format can be used so long as it is a data format which can be displayed by Internet viewing software (browser or the like).

In FIG. 10, reference numeral 1001 denotes a shop selection page which is displayed on the Web browser 108 of the client 100 on the basis of the image information which is formed and transferred by the center server 120 and is a page to select the shop for executing the print order from the shop to which the print has been ordered. Reference numeral 1002 denotes a user ID corresponding to the user name. When the client 100 accesses the center server 120, the client 100 accessed by the center server 120 is specified and embedded into the image information, thereby forming the user ID. To specify the client, the center server 120 can allow the user to input the user ID when the access is requested, or it is also possible to prepare the cookie information in the client and automatically discriminate by using the cookie information.

Reference numerals 1003, 1004, and 1005 denote shop names, that is, the names of the shops on the print output destination side included in all of the print orders which have been uploaded at present by the client which is specified by the user ID and is being accessed. The center server 120 can form the image information by searching the print order managed in the transfer means 125 on the basis of the user ID. The user designates one of the shop names 1003 to 1005, so that a list request for the uploaded print orders is issued to the designated shop from the Web browser 108 of the client 100 to the HTTP server 122 of the center server 120. The user ID and the shop ID are included in the list request. In correspondence to it, the center server 120 searches the print order uploaded by the user of the client 100 to the shop by using the user ID and shop ID with reference to the print order management table (FIG. 12) and forms a search result as image information. The HTTP server 122 of the center server 120 outputs the image information to the Web browser 108 of the client. On the basis of the image information, the user interface screen which is displayed to the Web browser 108 of the client becomes as shown at 1010.

In FIG. 10, reference numeral 1010 denotes a print order decision page which is displayed on the Web browser 108 of the client 100 on the basis of the image information that is formed and transferred by the center server 120. It is a page for displaying a plurality of print data (uploaded to the center server 120) to which the print order has been made so far for the shop selected by the user on the shop selection page 1001 and selecting one or more print orders which the user wants to make the print order, thereby collectively executing the print orders. Reference numerals 1011 and 1012 denote all print orders uploaded to the center server with respect to the shop selected on the shop selection page 1001. The print orders of the number as many as the number of data whose printing has been ordered to the selected shop are displayed. Reference numeral 1013 denotes an "ORDER" button. When the user presses this button, the Web browser 108 of the client discriminates the print order which has been designated and inputted (the check box is ON) by the user among the print orders 1011 and 1012 and transmits a print order instruction with respect to the designated print order to the HTTP server 122 of the center server 120 from the Web browser 108 via the Internet.

Reference numeral 1014 denotes a "CANCEL" button. When the user presses this button, the Web browser 108 interrupts the print ordering process. Reference numeral 1015 denotes the "PREVIEW" button for displaying the preview image corresponding to the print order whose check box is ON. When the user presses this button, an HTML obtaining request for previewing is issued from the Web browser 108 to the HTTP server 122. As a result of the CGI program, the center server 120 forms display data in the HTML format including the preview image 124 and transfers it to the client 100. The preview image is displayed to the Web browser 108 of the client.

Processes of the client will now be described. The client 100 executes processes such that in case of transmitting the print order to the center server 120, after the print order was transmitted to the center server 120, if the print order is not instantaneously made to the shop but the uploading instruction (1307 in FIG. 13) for allowing the print order to be managed into the print order management table is inputted, the print order is uploaded to the center server 120 via the Internet, and thereafter, the print ordering request for one or more print orders which were designated by the user (designated on the print order decision page 1010 in FIG. 10) and should be print-ordered from the print orders uploaded in the center server 120 is transmitted to the center server 120 via the Internet.

The client 100 also executes processes for accessing the center server 120 via the Internet and obtaining the order list of the print orders uploaded in the center server 120 (the list is obtained from the center server 120 in accordance with the designation of one of the shop names 1003 to 1005 designated by the user on the shop selection page 1001 in FIG. 10).

The client 100 forms the print order to be transmitted to the center server 120 by using the printer driver 102 and print order application 105 on the basis of the print target data formed by the application 101.

The client 100 executes a process for obtaining the printer information description file 103 (PPD file) from the center server 120 via the Internet, thereby forming the print order on the basis of the print setting described in the obtained printer information description file.

The client 100 executes a process for obtaining the shop information file 106 from the center server 120 via the Internet, thereby forming the print order including the shop name based on the obtained shop information file by the print order application 105.

The client 100 also executes the following processes. That is, in case of transmitting the print order to the center server 120, the client is promoted to input an alternative instruction (print order transmission page 1301 in FIG. 13) of the print ordering instruction (1306 in FIG. 13) for issuing the print order as it is after the print order was transmitted to the center server 120 or the uploading instruction (1307 in FIG. 13) such that the print order is transmitted to the center server 120 and the print order is not issued and the print order is allowed to be managed in the print management table (FIG. 12), if the uploading instruction is inputted, the client 100 uploads the print order to the center server 120 via the Internet, and thereafter, the print ordering request for one or more print orders which were designated by the user (designated on the print order decision page 1010 in FIG. 10) and should be print-ordered from the print orders uploaded in the center server 120 is transmitted to the center server 120 via the Internet.

(Flowchart for the Print Ordering Process in the Center Server)

Figure 11:
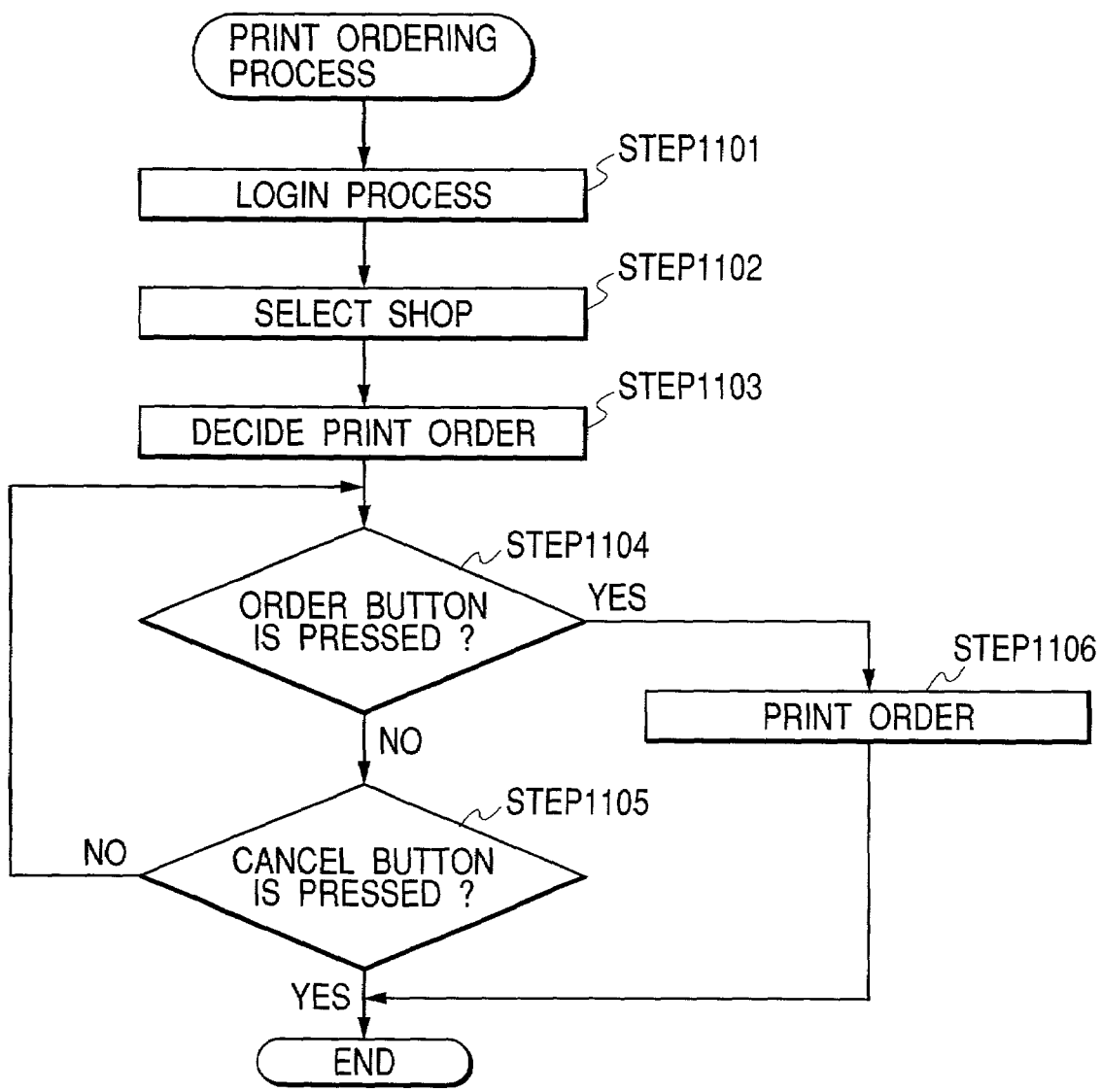
FIG. 11 is a flowchart for explaining a print ordering process in the print management apparatus of the invention.

FIG. 11 is a flowchart for the print ordering process in the center server 120. A control for the print ordering process on the client PC 100 will be described hereinbelow with reference to the flowchart.

The center server 120 can realize the present control by a method whereby the CPU 401 executes the arithmetic operating processes on the basis of the control programs stored (installed) in the HDD 409 or program ROM 403 so that it can be executed.

In STEP 1101, since the user of the client 100 issues the print order to the center server 120, the center server 120 executes a log-in process from the client 100. The center server 120 discriminates whether the user ID and the password which are inputted from the client 100 via the Internet coincide with those in the user information file (stored in the HDD 409) managed by the center server 120 or not. If the inputted user ID and password are correct, the center server 120 permits an access to the client 100 which requested the access, a communication session is held, and STEP 1102 follows. In case of the user who accesses for the first time, the user registering process is executed. In the center server 120, the user ID which is issued to the user of the client and the password which is inputted from the user of the client are registered into the user information file and managed. A cookie information file describing the user ID and the like is held in the HDD 309 of the client PC 100.

In STEP 1102, the center server 120 receives the shop name selected by the user by the operation of the pointing device or keyboard from the shop names 1003 to 1005 displayed in the shop selection page 1001 on the Web browser 108 of the client 100, specifies the shop which the user wants the print output, and selects the shop which should print and output from the shop information 106. When the shop is selected, STEP 1103 follows and the page of the Web browser 108 of the client PC 100 is changed to the print order decision page 1010.

In STEP 1103, the HTTP server 122 of the center server 120 searches the print order uploaded with respect to the shop selected by the client from the transfer means 125 on the basis of the user ID of the client which is being accessed and the shop selected in STEP 1102, forms the print order decision page 1010 in the HTML format to be displayed to the Web browser 108 of the client 100, and transfers it to the Web browser 108 of the client 100. In the print order decision page 1010 on the Web browser 108, when the user selects one or more of the displayed print orders 1011 and 1012 by operating the pointing device or keyboard, in accordance with the selected print order, the HTTP server 122 of the center server 120 receives the designation of the print order which the user desires and determines one or more print orders to which the print should be ordered. A table of FIG. 12 showing the correspondence among the user ID, shop ID, order ID, print data 129, and display image 130 has been stored in the HDD 409 of the center server 120.

FIG. 12 shows an example of the print order management table for explaining the correspondence between the print order and the print data in the center server 120. From the user ID inputted to the center server 120 in STEP 1101 and the shop ID showing the shop specified and selected by the user instruction in STEP 1102, the center server 120 forms the print order decision page 1010 including all of the corresponding order IDs and displays them to the Web browser 108 of the client 100. At this time, the thumbnail image 123 of the display image 130 is obtained from the corresponding display image pass and the print order decision page 1010 including the thumbnail image is formed.

When the print order to be print-ordered is determined, the processing routine advances to STEP 1104 and step 1105. The center server 120 discriminates whether the inputting operation of either the ordering or the cancellation has been performed by pressing the "ORDER" button or "CANCEL" button on the print order decision page 1010 of the Web browser 108 or not by analyzing the information which is inputted from the client PC 100 via the Internet. If it is determined in STEP 1104 that the "ORDER" button has been pressed, STEP 1106 follows and the foregoing print ordering process is executed. The processing routine is finished. If it is determined in STEP 1105 that the "CANCEL" button has been pressed, the print ordering process is finished.

In STEP 1106, the center server 120 obtains the print order 129 by the print order pass corresponding to the order ID decided on the print order decision page 1010 in FIG. 12, and the print order 129 is transferred to the shop 140 corresponding to the shop ID via the transfer apparatus 125 on the center server 120. When the print order 129 is transferred to the shop, on the shop 140, the printer description language file (in the embodiment, PDF data) 126 extracted from the print order in accordance with the print set information 107 is image-processed on the basis of the print set information, and the data is printed by the designated printer.

The processes of the center server 120 will now be summarized. The center server 120 executes the following processes. That is, the print order is received from the client 100 (YES in STEP 907 in FIG. 9), the received print order is managed into the print order management table (FIG. 12) in correspondence to the user ID of the client 100 without performing the print order processing to the shop (NO in STEP 911; corresponding to the process in STEP 912), the print order to be returned as an order list of the print order is searched from the print order managed in the print order management table (FIG. 12) with reference to the user ID of the client 100 in accordance with the list obtaining request from the client 100, and the image information (the print order decision page 1010 in FIG. 10) of the order list including the searched print order is returned to the client 100 who requested.

The center server 120 manages the print order received from the client 100 into the print order management table (FIG. 12) in correspondence to the shop ID which is included in the print order and indicates the shop which should execute the printing process. At the time of the search responsive to the request from the client, the searching process is executed by using the shop ID.

The center server 120 receives the print ordering instruction to designate one or more print orders from the client 100 (process in STEP 1104 in FIG. 11) in accordance with the image information (the print order decision page 1010 in FIG. 10) of the order list returned to the client 100 and controls so as to transmit one or more print orders which is/are designated by the received print ordering instruction to the designated shop (process in STEP 1106). According to the above control, as mentioned above, the process of the transmitting method which differs in dependence on whether the designated shop is normally connected or dial-up connected to the Internet is controlled.

According to the embodiment as described above, the print orders uploaded by the client 100 have been stored on the center server 120, can be collectively ordered in the print ordering process, and are collectively made every shop. Therefore, delivering processes after completion of the print output can be collectively performed and a delivery charge can be saved.

Since the print order corresponding to the user ID is separately displayed every shop, even after the print order was uploaded to the center server 120, the user can easily recognize which print order has been updated to which shop.

A construction of a data processing program which can be readout by a printing system to which the information processing apparatus according to the invention can be applied will now be described with reference to a memory map shown in FIG. 17. FIG. 17 is a diagram for explaining the memory map of a memory medium for storing various data processing programs which can be read out by a print system to which the information processing apparatus according to the invention can be applied.

Although not particularly shown, information to manage a group of programs which are stored into the memory medium, for example, version information, creator, and the like is also stored. There is also a case where information which depends on the OS or the like on the program reading side, for example, icons for identifying and displaying the program and the like are stored.

Further, data depending on the various programs has also been managed in the directory. There is also a case where a program to install the various programs into a computer or, in the case where the installing program has been compressed, a program for decoding it or the like is also stored.

Although the invention has been described on the assumption that the first to sixth data processing programs are stored in the same memory medium, the invention is not limited to such a construction. For example, it is also possible to construct the apparatus in a manner such that the first data processing program corresponding to the flowchart shown in FIG. 5, the second data processing program corresponding to the flowchart shown in FIG. 6, and the third data processing program corresponding to the flowchart shown in FIG. 15 are prepared as one memory medium which is used for the client PC, the fourth data processing program corresponding to the flowchart shown in FIG. 9, the fifth data processing program corresponding to the flowchart shown in FIG. 11, and the sixth data processing program corresponding to the flowchart shown in FIG. 16 are prepared as another memory medium which is used for the center server, and those programs are distributed.

The invention also incorporates a case where the programs of the software to realize the functions of the embodiments mentioned above (in the embodiments, programs corresponding to the flowcharts shown in FIGS. 5, 6, 9, 11, 15, and 16) are directly supplied to a system or an apparatus or supplied from a remote place, and a computer of the system or apparatus reads out the supplied programs and executes them, so that those functions are accomplished. In this case, the invention is not limited to the form of the program but any form can be used so long as it has the function of the program.

Therefore, program codes themselves which are installed to the computer in order to realize the functions and processes of the present invention by the computer also realize the invention. That is, the invention also incorporates the computer program itself for allowing the computer to realize the functions and processes.

In such a case, the invention is not limited to the form of the program but any form can be used so long as it has the function of the program; that is, a form of object codes, a program which is executed by an interpreter, script data which is supplied to the OS, or the like can be used.

As a recording medium for supplying the program, for example, it is possible to use a floppy disk, a hard disk, an optical disk, a magnetooptic disk, an MO, a CD-ROM, a CD-R, a CD-RW, a magnetic tape, a non-volatile memory card, an ROM, a DVD (DVD-ROM, DVD-R), or the like.

Besides, as a supplying method of the program, the program can be supplied by a method whereby the computer is connected to a homepage of the Internet by using the browser of the client computer, the computer program itself of the invention is downloaded from the homepage or a compressed file including an automatic installing function is downloaded to a recording medium such as a hard disk or the like. The program of the invention can be also realized by a method whereby the program codes constructing the program of the invention are divided into a plurality of files and downloaded each file from a different homepage. That is, a WWW server for downloading the program files to realize the functions and processes of the invention by the computer to a plurality of users is also incorporated in the embodiments of the invention.

The program of the invention can be also realized by a method whereby the program of the invention is encrypted and stored into a memory medium such as a CD-ROM or the like and distributed to the users, the users who can satisfy predetermined conditions are allowed to download key information for decoding the encryption from the homepage via the Internet, and the encrypted program is executed by using the key information and installed into a computer.

In addition to a method whereby the functions of the embodiments mentioned above are realized by a method whereby a computer executes the read-out program, the functions of the embodiments mentioned above can be realized by a method whereby the OS or the like which operates on the computer executes a part or all of the actual processes on the basis of instructions of the programs, and the functions are realized by those processes.

Further, the invention also incorporates a case where the program read out from the recording medium is written into a memory equipped for a function expanding board inserted into a computer or a function expanding unit connected to a computer, and thereafter, a CPU or the like equipped for the function expanding board or function expanding unit executes a part or all of the actual processes on the basis of instructions of the programs, and the functions of the embodiments mentioned above are realized by those processes.

As many apparently widely different embodiments of the present invention can be made without departing from the spirit and scope thereof, it is to be understood that the invention is not limited to the specific embodiments thereof except as defined in the appended claims.

As described above, in the client, the print data is formed by using the printer driver which can set the print set information corresponding to a plurality of printers on the basis of the printer information description file, the print order is formed on the basis of the formed print data and the print set information set by the printer driver, the activation of the Web browser is promoted, and the center server which can communicate is requested to access via the Internet. Therefore, in a system which receives the print service via the Internet, an effect such that the updating of the printer provided for the shop to which the print service can be applied can be recognized by the client without installing each new printer driver is obtained.

Since the printer information description file is obtained from the center server via the Internet, an effect such that even if the printer of the shop is updated, the print order to such a printer can be easily formed without newly preparing a printer driver in the client is obtained.

The shop information file describing the attributes of the shop which prints and outputs the print order is obtained from the center server via the Internet, and the print order to designate the shop name included in the obtained shop information file is formed. Therefore, an effect such that even if the shop to which the print system can be applied is newly added, the print order to such a shop can be formed in the client is obtained.

In the center server, in accordance with the obtaining request from the client, the printer information description file describing the print set information corresponding to a plurality of printers is transmitted to the client via the Internet, the print data described by the page description language included in the print order which is transmitted from the client is data-converted into the printer description language file as a form which does not depend on the printer of the shop, and the shop print order for requesting the shop to print is formed from the print set information for designating the print setting included in the print order and the data-converted printer description language file. Therefore, in the shop, the print data is printed from the printer description language file (PDF) by using the printer driver for the printer in the shop. An effect such that the client does not need to prepare all printer drivers for the printers of the shop and a burden on the user is reduced is obtained.

The preview image is formed by data-converting the image of the data-converted printer description language file and the formed preview image is transmitted to the client via the Internet in accordance with the preview request from the client. Therefore, an effect such that the client can obtain the preview image of the print order uploaded to the center server by itself from the center server and can confirm a way of printing is obtained.

What is claimed is:

1. A print processing apparatus capable of communicating with a print management apparatus via a network, comprising:
   document forming means for forming a document by using an application program;
   inquiring means for inquiring from said print management apparatus whether a printer information description file stored in said print management apparatus is updated;
   receiving means for receiving information for accessing the printer information description file from said print management apparatus as a response to the inquiry;
   downloading means for downloading the printer information description file from said print management apparatus on the basis of the information for accessing; and
   forming means for forming print data in accordance with the printer information description file by using a printer driver.

2. An apparatus according to claim 1, further comprising:
   obtaining means for obtaining a list file of printers with which said print management apparatus is capable of communicating;
   judging means for judging whether printers listed in the list file are capable of printing the formed print data;
   displaying means for displaying the printers in accordance with a judgment result of said judging means;
   selecting means for selecting one of the printers displayed by said displaying means; and
   uploading means for unloading, to said print management apparatus, printer information on the selected printer and the print data.

3. An apparatus according to claim 2, wherein said print management apparatus forms a printer description language file by converting the print data on the basis of the printer information, and transfers the formed printer description language file.

4. A controlling method for a print processing apparatus capable of communicating with a print management apparatus via a network, comprising:
   a document forming step of forming a document by using an application program;
   an inquiring step of inquiring from said print management apparatus whether a printer information description file stored in said print management apparatus is updated;
   a receiving step of receiving information for accessing the printer information description file from said print management apparatus as a response to the inquiry;
   a downloading step of downloading the printer information description file from said print management apparatus on the basis of the information for accessing; and
   a forming step of forming print data in accordance with the printer information description file by using a printer driver.

5. A computer-readable storage medium on which is stored a computer-readable program of a controlling method of a print processing apparatus capable of communicating with a print management apparatus via a network, the program comprising:

a document forming step of forming a document by using an application program;

an inquiring step of inquiring from said print management apparatus whether a printer information description file stored in said print management apparatus is updated;

a receiving step of receiving information for accessing the printer information description file from said print management apparatus as a response to the inquiry;

a downloading step of downloading the printer information description file from said print management apparatus on the basis of the information for accessing; and a forming step of forming print data in accordance with the printer information description file by using a printer driver.

* * * * *

UNITED STATES PATENT AND TRADEMARK OFFICE
CERTIFICATE OF CORRECTION

PATENT NO. : 7,145,679 B2 Page 1 of 1
APPLICATION NO. : 10/045156
DATED : December 5, 2006
INVENTOR(S) : Yosato Hitaka It is certified that error appears in the above-identified patent and that said Letters Patent is hereby corrected as shown below:

In the Drawings
SHEET 12:
FIG. 14, in reference numeral 1403, "PHOTO P" should read -- PHOTO PAPER --.

COLUMN 1:
Line 60, "such-that" should read -- such that --.

COLUMN 4:
Line 50, "PostScript" should read -- (Post Script --.

COLUMN 6:
Line 5, "out them" should read -- them out --.

COLUMN 26:
Line 37, "unloading," should read -- uploading, --.

Signed and Sealed this

Eighteenth Day of March, 2008

JON W. DUDAS
*Director of the United States Patent and Trademark Office*